(12) United States Patent
Maucec

(10) Patent No.: US 11,934,440 B2
(45) Date of Patent: Mar. 19, 2024

(54) AGGREGATION FUNCTIONS FOR NODES IN ONTOLOGICAL FRAMEWORKS IN REPRESENTATION LEARNING FOR MASSIVE PETROLEUM NETWORK SYSTEMS

(71) Applicant: Saudi Arabian Oil Company, Dhahran (SA)

(72) Inventor: Marko Maucec, Englewood, CO (US)

(73) Assignee: Saudi Arabian Oil Company, Dhahran (SA)

( * ) Notice: Subject to any disclaimer, the term of this patent is extended or adjusted under 35 U.S.C. 154(b) by 1098 days.

(21) Appl. No.: 16/534,777

(22) Filed: Aug. 7, 2019

(65) Prior Publication Data
US 2021/0042633 A1    Feb. 11, 2021

(51) Int. Cl.
| | | |
|---|---|---|
| *G06F 16/36* | (2019.01) | |
| *G06F 16/2458* | (2019.01) | |
| *G06F 16/35* | (2019.01) | |

(52) U.S. Cl.
CPC ........ *G06F 16/367* (2019.01); *G06F 16/2465* (2019.01); *G06F 16/355* (2019.01)

(58) Field of Classification Search
CPC .. G06F 16/367; G06F 16/2465; G06F 16/355; G06F 16/9024; G06F 16/906
See application file for complete search history.

(56) References Cited

U.S. PATENT DOCUMENTS

| | | | |
|---|---|---|---|
| 8,121,971 B2 | 2/2012 | Edwards et al. | |
| 8,195,401 B2 | 6/2012 | Ella et al. | |
| 2004/0024739 A1 | 2/2004 | Copperman et al. | |
| 2007/0271039 A1* | 11/2007 | Ella | G06Q 50/06 702/6 |

(Continued)

FOREIGN PATENT DOCUMENTS

WO    WO2018029454    2/2018

OTHER PUBLICATIONS

Zhou et al., "Graph neural networks: a review of methods and applications," Cornell Universty library, Jul. 2019, 22 pages.

(Continued)

*Primary Examiner* — Albert M Phillips, III
*Assistant Examiner* — Fatima P Mina
(74) *Attorney, Agent, or Firm* — Fish & Richardson P.C.

(57) ABSTRACT

Systems and methods include a method for aggregating source data to form ontological frameworks. Aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. Source data is received in real-time from disparate sources and in disparate formats. The source data provides information about the components of the facility (Continued)

and external systems with which the facility interacts. Using the aggregation functions, the source data is aggregated to form the ontological frameworks. Each ontological framework models a component of the Things category, a component of the a Events category, or a component of the Methods category.

12 Claims, 15 Drawing Sheets

(56) References Cited

U.S. PATENT DOCUMENTS

| | | | | |
|---|---|---|---|---|
| 2008/0255862 | A1* | 10/2008 | Bailey | G06Q 40/06 707/999.107 |
| 2014/0291023 | A1* | 10/2014 | Edbury | G06T 11/206 345/440.2 |
| 2015/0095303 | A1* | 4/2015 | Sonmez | G06N 5/003 707/707 |
| 2015/0278407 | A1* | 10/2015 | Vennelakanti | E21B 43/00 703/7 |
| 2017/0293842 | A1 | 10/2017 | Buchanan | |
| 2018/0081923 | A1* | 3/2018 | Cheung | G06F 16/2462 |
| 2018/0247224 | A1* | 8/2018 | Garcia Duran | G06N 20/00 |
| 2019/0102430 | A1* | 4/2019 | Wang | G06F 16/24549 |
| 2019/0107644 | A1 | 4/2019 | Nia | |
| 2019/0107645 | A1 | 4/2019 | Nolan et al. | |
| 2019/0121801 | A1* | 4/2019 | Jethwa | G06F 16/243 |
| 2021/0042634 | A1 | 2/2021 | Maucec et al. | |
| 2021/0324727 | A1 | 10/2021 | Hildebrand et al. | |

OTHER PUBLICATIONS

Hildebrandt et al., "A recommender system for complex real world applications with nonlinear dependencies and knowledge graph context," The Semantic Web, ESWC, May 2019, 11503:179-193.
PCT International Search Report and Written Opinion in International Appln. No. PCT/US2020/045350, dated Nov. 19, 2020, 16 pages.
Agrawal et al., "Large-scale analysis of disease pathways in the human interactome," Pacific Symposium on Biocomputing, Dec. 2017, 12 pages.
Bengio et al., "Representation Learning: A review and new perspectives," International Conference on Learning Representations, 2014, 30 pages.
Carvajal et al., "Intelligent Digital Oil and Gas Fields: Concepts, Collaboration and Right-time Decisions," Elsevier, 2018, pp. 149-195.
Ge and Chen, "Constructing Ontology-based Petroleum Exploration Database for Knowledge Discovery," Applied Mechanics and Materials, vol. 20-32, 2010, 7 pages.
Goodrich et al., "Chapter 14.5, Directed Acyclic Graphs," in Data Structures and Algorithms in Java, Wiley, 2014, 20 pages.
Hamilton et al., "Representation Learning on Graphs: Methods and Applications," Bulletin on the IEEE Computer Society Technical Committee on Data Engineering, 2018, 23 pages.
Kharlamov et al., "Ontology Based Data Access in Statoil, " Journal of Web Semantics, vol. 44, 2015, 16 pages.
Leskovec et al., "Chapter 9: Recommendation Systems," in Mining of Massive Datasets, 2014, 17 pages.
Leskovec et al., "Next Generation Algorithms for Networks," presentation from keynote at BigNet workshop, Georgia Tech, 2017, 69 pages.
Lozano et al., "RockQuery: An Ontology-based Data Tool," ICEIS 2015, 17th International Conference on Enterprise Information Systems, 2015, 10 pages.
Ma et al., "Collaborative Filtering in Development Well Recommendation for Well Argumentation," 5th International Conference on Intelligent Systems and Engineering Applications, 2014, 4 pages.
Popa et al., "Case-Based Reasoning Approach for Well Failure Diagnostics and Planning, " SPE 114229-MS, presented at the 2008 SPE Western Regional and Pacific Section AAPG Joint Meeting in Bakersfield, California, Mar. 31-Apr. 2, 2008, 7 pages.
Soma et al., "Semantic Web Technology for Smart Oil Field Applications," SPE 112267, presented at the SPE Intelligent Energy Conference and Exhibition, Amsterdam, the Netherlands, Feb. 25-27, 2008, 8 pages.
Xu et al., "How powerful are graph neural networks?" published as a conference paper at ICLR 2019, Feb. 22, 2019, 17 pages.
Ying et al., "Graph Convolutional Neural Networks for Web-scale Recommender Systems," KDD 2018, Aug. 23, 2018, 10 pages.
Zhu et al., "Applying Semantic Web Techniques to Reservoir Engineering: Challenges and Experiences from Event Modeling," 7th IEEE International Conference on Information Technology, Las Vegas, NV, Jan. 2010, 7 pages.
Zitnik et al., "Modeling polypharmacy side effects with graph convolutional networks," Bioinformatics, vol. 34, 2018, 9 pages.
GCC Examination Report in GCC Appln. No. GC 2020-40254, dated Dec. 20, 2021, 5 pages.
GCC Examination Report in GCC Appln. No. GC 2020-40253, dated Dec. 20, 2021, 5 pages.
GCC Examination Report in GCC Appln. No. GC 2020-40253, dated Sep. 7, 2021, 5 pages.
GCC Examination Report in GCC Appln. No. GC 2020-40254, dated Sep. 7, 2021, 5 pages.
PCT International Search Report and Written Opinion in International Appln. No. PCT/US2020/045346, dated Oct. 27, 2020, 15 pages.

* cited by examiner

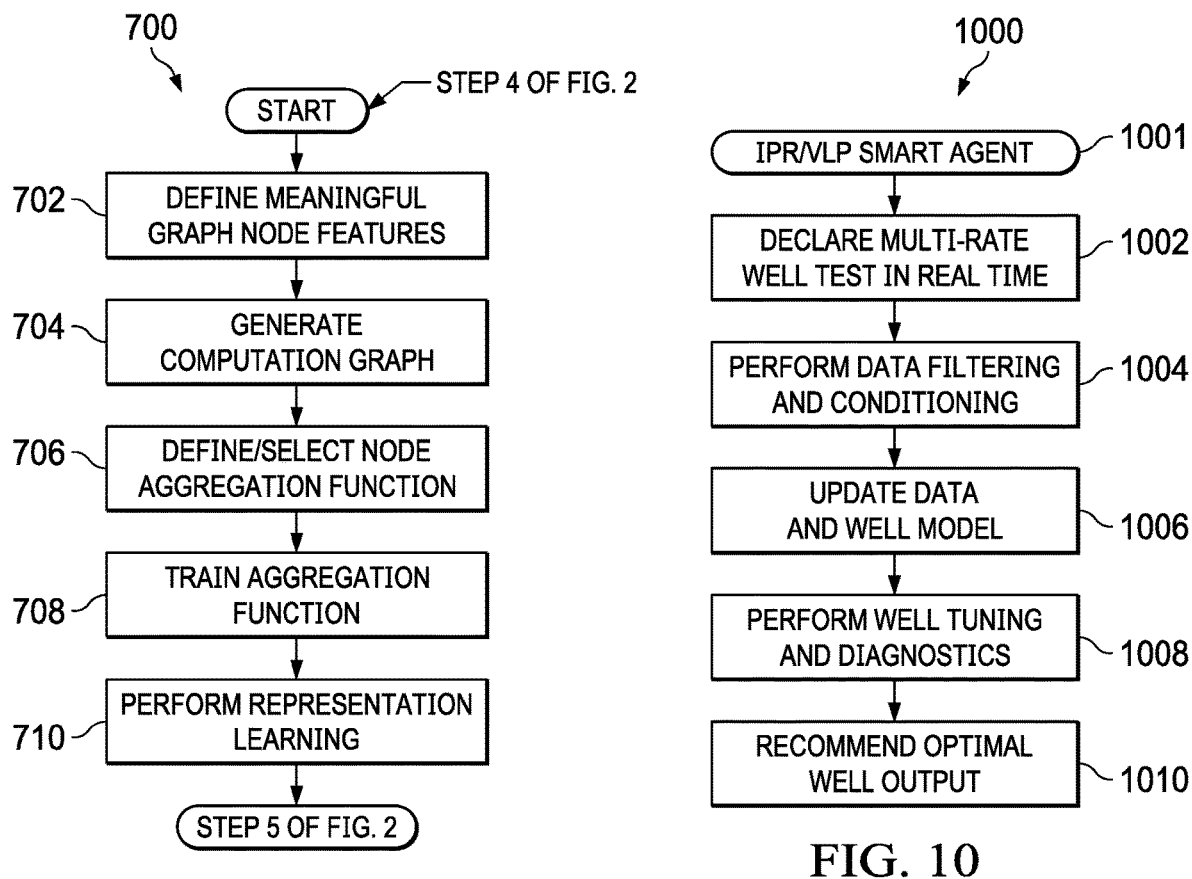
FIG. 7
FIG. 10
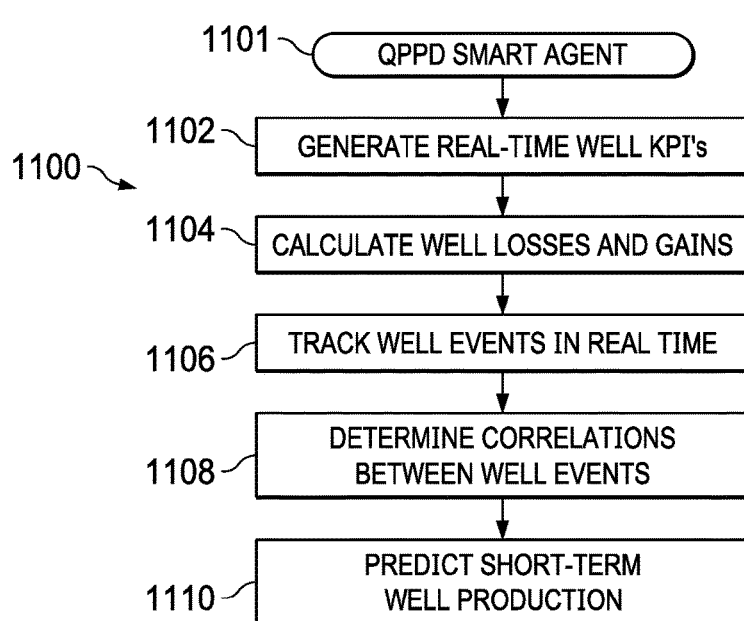
FIG. 11

AGGREGATION FUNCTIONS FOR NODES IN ONTOLOGICAL FRAMEWORKS IN REPRESENTATION LEARNING FOR MASSIVE PETROLEUM NETWORK SYSTEMS

BACKGROUND

The present disclosure applies to the use of disparate data sources that are used for large-scale petroleum engineering (PE) systems. Operational data in large-scale PE systems are typically scattered over many disparate sources and databases. Data records evolve over time, database querying is cumbersome, and data retrieval is time- and resource-consuming. Challenges imposed on users of large-scale PE systems include, for example, enabling time- and resource-efficient access to information, providing unified views of the information to streamline data-driven processes, and enabling effective knowledge management to optimize decision-making process and maximize economic returns. Ontological frameworks are used as tools for hierarchical unification, semantic querying in Big Data storage and retrieval (for example, cloud-based data access, data warehouses, and data lakes), and modeling. Ontology-based data access (OBDA) techniques are used for reservoir/asset knowledge retention, provenance, evolution, update, and management of complex Big Data.

Successful applications of OBDA and semantic modeling in the oil and gas domain have already been demonstrated in data mining and knowledge mapping from relational databases, integration of reservoir simulation models and production forecasts in integrated asset management, analysis of reservoir engineering events, and well recommendation and argumentation. However, applications of OBDA techniques in the exploration and production (E&P) domain have been limited to petroleum exploration data, using traditional recommendation algorithms (such as rule-based reasoning) and collaborative filtering. Such techniques typically prove suboptimal when deployed to extremely massive and complex PE data sets, scattered over heterogeneous data sources such as Exploration and Petroleum engineering PRoduction (EPPR) database, OpenWorks, and Compass. Commercially available alternatives typically address only a small part of the challenge, namely building knowledge graphs.

SUMMARY

The present disclosure describes techniques that can be used for managing and using inputs to large-scale petroleum engineering (PE) systems, where the inputs are from disparate sources. In some implementations, a computer-implemented method for aggregating source data to form ontological frameworks includes the following. Aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. Source data is received in real-time from disparate sources and in disparate formats. The source data provides information about the components of the facility and external systems with which the facility interacts. Using the aggregation functions, the source data is aggregated to form the ontological frameworks. Each ontological framework models a component of the Things category, a component of the a Events category, or a component of the Methods category.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques can include the use of knowledge engines that use, for example, large-scale representation learning, web-like recommendation systems, and application- and domain-specific smart agents that are integrated on top of knowledge platforms. Second, techniques can include the implementation of large-scale network representation learning on PE systems domains. Third, representations learned using deep models such as convolutional neural networks (CNNs) have significant advantages over traditional recommendation algorithms, including collaborative filtering and case-based and rule-based reasoning, because the representations provide high utility and can be reused in various recommendation tasks. Therefore, representation learning from large-scale petroleum network systems and graph structures can represent significant advantages (for example, smart agents) and wider applicability over traditional, fit-for-purpose applications in petroleum/reservoir engineering. The advantages apply to well event modeling, well argumentation, and well failure diagnostics, for example. Fourth, when applied to PE systems, the representations learned from large-scale networks (or graphs) can be uniquely described in geological and physical domains of subsurface models. For example, when aggregation functions are built for learning representations on reservoir connectivity, the aggregation functions can be trained using reservoir properties representing main trends in spatial reservoir continuity, such as depositional facies, high-permeability flow units, and fracture networks. Such reservoir properties can be organized in the form of three-dimensional (3D) reservoir simulation grids or arrays, for example. For the purpose of training graph/network deep learning models, reservoir properties can be converted from arrays to vectors. For the purpose of accelerating the process of training, vectors of reservoir properties can be mapped in a reduced-order or reduced-dimensionality domain using transformations such as Fast Fourier Transform (FFT), Discrete Cosine Transform (DCT), and Principal Component Analysis (PCA). Conventional representation learning techniques can be applied, for example, in the analysis of social network connectivity, producing representations that resemble graph edges. As a result, representation connectors can exist between graph nodes in a Euclidean domain, and the highest connectivity can be represented by the shortest geometrical (or Euclidean) distance between the two nodes. This conventional approach may not provide accurate representation of geological and physical attributes of pressure propagation and fluid transport in reservoir simulation models of PE systems. However, an advantage of learning representations on reservoir connectivity from spatial reservoir properties, as presented in the present disclosure, is that reservoir connectivity can be more accurately described with curvilinear (or geodesic) distances conditioned to dominant fluid flow and pressure propagation paths. Examples of such conditioning of training models for learning representations on reservoir connectivity include 3D distributions of streamline trajectories traced using a full-physics (or finite difference) simulation or streamline simulation. An example of representation learned from streamline-mapped reservoir connectivity is the streamlined time-of-flight (TOF), which is in reverse proportional relation with reservoir permeability. For example, higher values of TOF along a particular streamline correspond to lower permeability values, and vice versa.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 7 is a flow diagram of an example of a process for building a knowledge discovery engine, according to some implementations of the present disclosure.

FIG. 10 is a flow diagram of an example of a smart agent process for well inflow performance relationship/vertical lift performance (IPR/VLP) performance, according to some implementations of the present disclosure.

FIG. 11 is a flow diagram of an example of a smart agent process for quick production performance diagnostics (QPPD), according to some implementations of the present disclosure.

Like reference numbers and designations in the various drawings indicate like elements.

DETAILED DESCRIPTION

Figure 1:
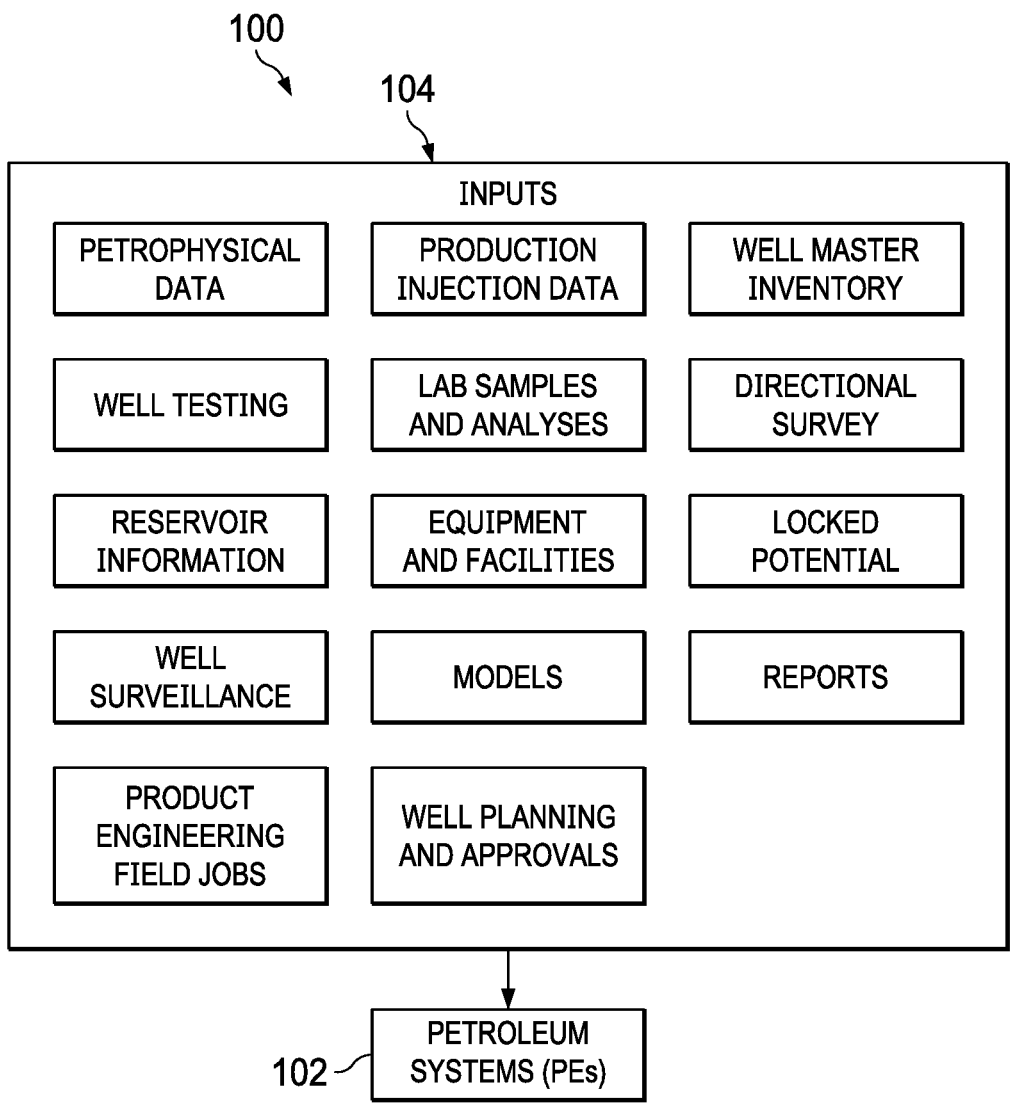
FIG. 1 is a block diagram showing an example of a system using categories of inputs to update petroleum systems (PEs), according to some implementations of the present disclosure.

The following detailed description describes techniques for managing and using inputs to large-scale petroleum engineering (PE) systems, where the inputs are from disparate sources. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, techniques of the present disclosure can provide a representation learning to massive petroleum engineering system (ReLMaPS), organized as knowledge graphs or networks. For example, a knowledge discovery engine can be built around an ontological framework with an evolving PE vocabulary that enables automated unified semantic querying. The techniques can include techniques that combine, for example, techniques used in deep representation learning (DRL), online purchasing and network based discovery, disease pathways discovery, and drug engineering for therapeutic applications. The techniques can also provide, for example, 1) implementation of knowledge graphs and networks of large-scale (or big data) PE systems data as a unified knowledge engine for DRL; 2) an integration of DRL tools, such as graph convolutional neural networks (GCNNs) in PE knowledge graphs, as enablers for implementations of large-scale recommendation (or advisory) systems; and 3) an integration of case- and objective-specific smart agents focusing on providing recommendation/advice on decision actions related to production optimization, rapid data-driven model calibration, field development planning and management, risk mitigation, reservoir monitoring, and surveillance. For example, optimization can refer to setting or achieving production values that indicate or result in a production greater than a predefined threshold or to setting or achieving production values that minimize the difference or misfit between the numerically simulated model and observed or measured data.

In general terms, an ontological framework (OF) can connect and define relationships between data that is distributed, stored, and scattered through disparate sources using high-level mappings. The relationships can facilitate automatic translation of user-defined queries into data-level queries that can be executed by the underlying data management system. For example, automated translation from user-defined queries to data-level queries can be implemented in the realm of using reservoir simulation models to generate and rank production forecasts. An example of a user-defined semantic query can be "Identify all simulations models in which the estimate of ultimate recovery is greater than XXX % (in relative terms, such as produced reserves over original oil in place) or greater than YYY millions of barrels of oil (in absolute, cumulative terms)". The translation can map such a user-defined semantic query to data-type specific metadata that will capture and rank (by ultimate recovery yet greater than the threshold) the models with specific information (for example, number of producer and injector wells, number and types of completions, number and subsea-depth of zones from which the wells produce, type of well stimulation used, and type of recovery strategy used). Table 1 represents the complexity of data sources that can be used as inputs to massive PE systems. The data sources can be characterized by volume, velocity, variety, veracity, virtual (data), variability, and value.

TABLE 1

Data Sources for Large PE Systems

| Categories | Information Asset Name |
|---|---|
| Petrophysical Data | Well logging |
| | Formation testing (well logging) |
| | Flowmeter survey |
| | Special core analysis (SCAL) |
| | Core |
| Well Testing | Raw Phase I, II survey (build-up and fall-off) |
| | Pressure transient analysis (PTA) |
| | DST |
| Reservoir Information | Completion events |
| | Well status |
| | Pay summary |
| | Fluid contacts |
| | Field reservoir data |
| | Inflow performance relationship (IPR) blocks |
| | Perforating |
| | Ministry of Petroleum Affairs (MINPET) report |
| | Metrics |
| | Tubing details |
| | Casing details |
| | Plug installations |
| Well Surveillance | Annuli survey |

TABLE 1-continued

Data Sources for Large PE Systems

| Categories | Information Asset Name |
|---|---|
| | Pressure survey |
| | Temperature survey |
| | Well Rate |
| | Well scale monitoring |
| | Wireline services |
| | PE real-time data |
| Product Engineering Field Jobs | Well stimulation |
| | Fish |
| | Inhibitor jobs |
| Production Injection Data | Production injection volumes |
| | Well operating data |
| | Avails |
| | Targets |
| Lab Samples and Analyses | Water sample analysis |
| | Gas sample analysis |
| | Crude sample analysis |
| | Pressure/volume/temperature (PVT) Analysis |
| Equipment and Facilities | Wellheads and chokes |
| | Surface facilities |
| | Electrical submersible pump (ESP) installations and performance |
| | Geographical information system (GIS) |
| | Well tie-in |
| Models | Wells and networks models |
| | Simulation models |
| | Simulation workflows |
| | Geo and fracture models |
| | PVTSim |
| | ESP (Electric Submersible Pump) models |
| | Material balance models |
| Well Planning and Approvals | Well activity scheduling and tracking |
| | Integrated business planning |
| | Well planning and approvals |
| Well Master Inventory | Well master inventory |
| Directional Survey | Deviation survey |
| Locked Potential | Locked potential |
| Reports | Maps |
| | Isobaric maps structure maps |
| | Fluid contact maps bubble maps |
| | Pore-volume |
| | Net thickness map porosity map |
| | Permeability map |
| | Reserves sheet |
| | Daily completion/stimulation reports |
| | Drilling requirements |
| | Land use |
| | Well activities/events |
| | Basic reservoir data sheets |
| | MINPET report |
| | Crude slate |
| | Reservoir performance report |
| | Separator and deliverability test |
| | Other reports |

FIG. 1 is a block diagram showing an example of a system 100 using categories of inputs 104 to update petroleum systems (PEs) 102, according to some implementations of the present disclosure. For example, the inputs 104 can include the categories of inputs (for example, databases, documents and records of information assets) identified in Table 1.

Figure 2A:
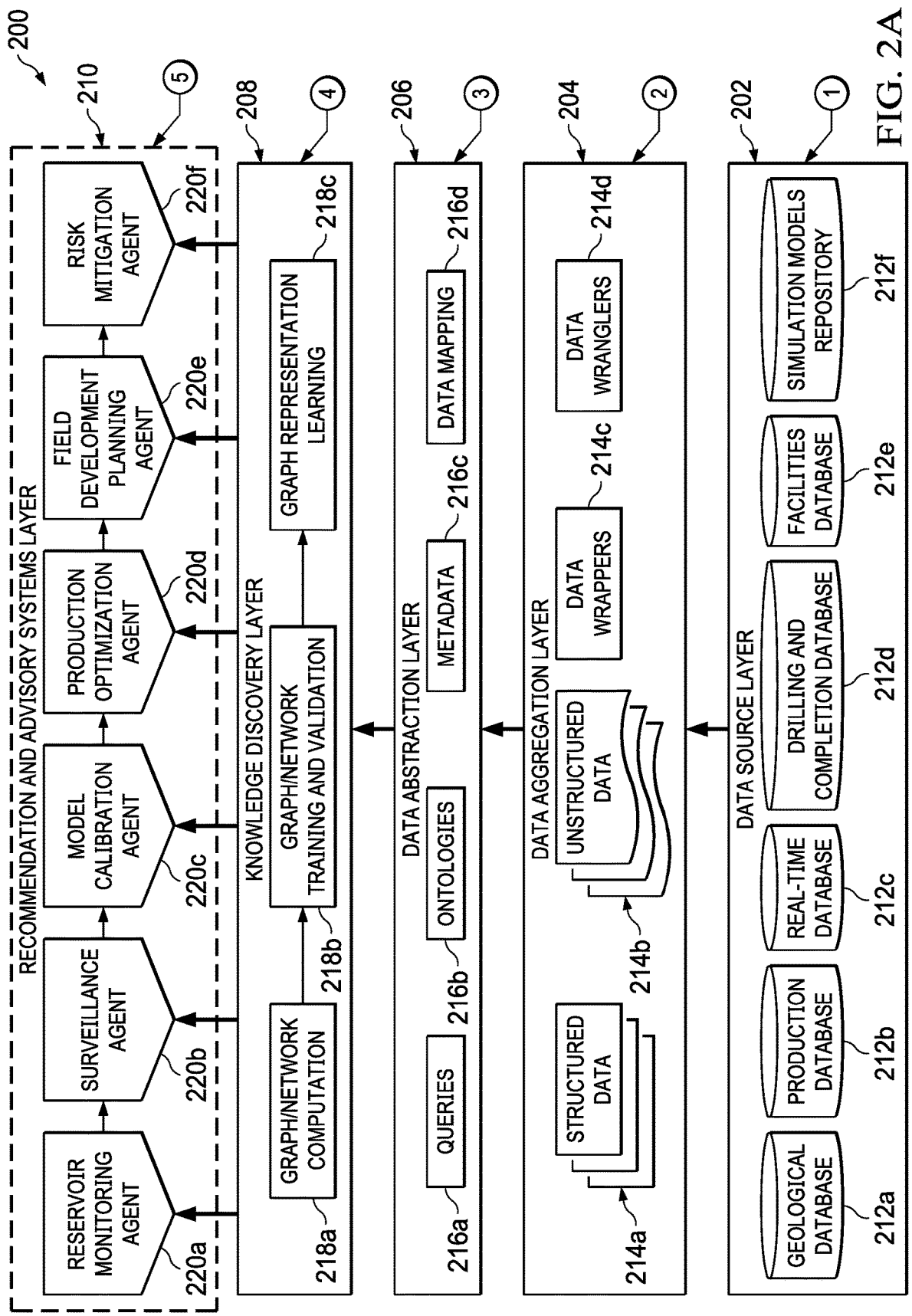
FIG. 2A is a block diagram showing an example of layers within a representation learning to massive petroleum engineering system (ReLMaPS), according to some implementations of the present disclosure.

FIG. 2A is a block diagram showing an example of layers 202-210 within a representation learning to massive petroleum engineering system (ReLMaPS) 200, according to some implementations of the present disclosure. The layers 202-210 can be used to implement steps 1-5, respectively, of a method provided by the ReLMaPS 200 (or system 200).

In a data source layer 202 (step 1), source data is accessed. The source data can include data sources 212a-212f, including the data associated with the input categories outlined in Table 1. Data sources can be interconnected and stored in databases and repositories, combining geological data, production data, real-time data, drilling and completion data, facilities data, and simulation models repositories. For example, the term real-time data can correspond to data that is available or provided within a specified period of time, such as within one minute, within one second, or within milliseconds.

In a data aggregation layer 204 (step 2), the source data can be aggregated using techniques such as data wrangling, data shaping, and data mastering. Aggregation can be performed on structured data 214a, unstructured data 214b, data wrappers 214c, data wranglers 214d, and streaming data, for example. Some data types can be abstracted in the form of OFs. In some implementations, the OFs for the domain of PE systems data can be modeled as classified in three main categories. A first category of Things can represent electro-mechanical components such as wells, rigs, facilities, sensors, and metering systems.

A second category of Events can represent actions (manual or automated) which can be executed by components of the Things category. For example, actions can be used to combine measurements, validation, and conditioning of specific dynamic responses, such as pressure and fluid rates. Things and Events categories can be interconnected and related through principles of association.

A third category of Methods can represent technology (for example, algorithms, workflows, and processes) which are used to numerically or holistically quantify the components of the Events category. The Events and Methods categories can be causally interconnected through the principles of targeting.

Figure 3:
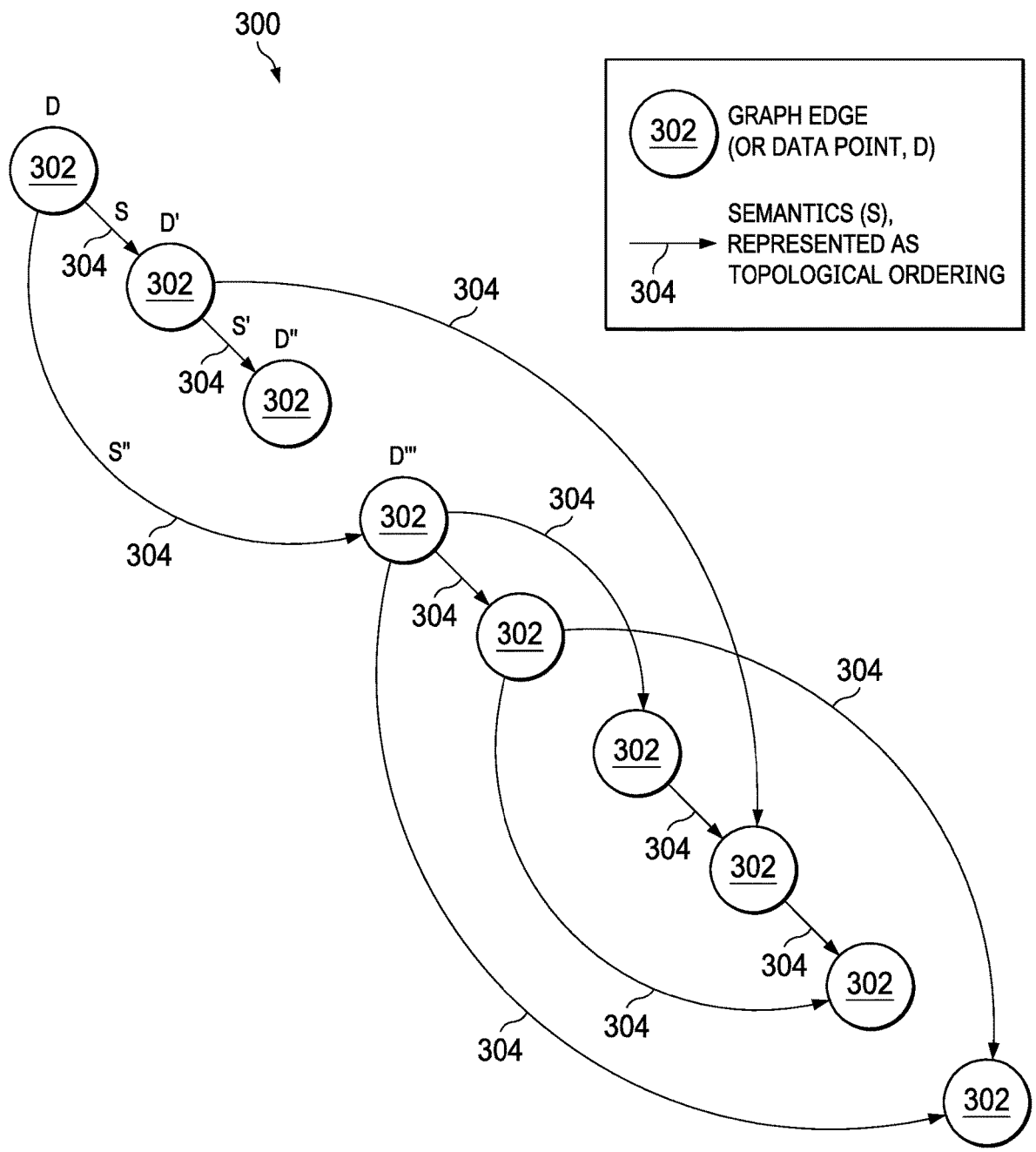
FIG. 3 is a graph showing an example of a topological ordering of directed acyclic graphs (DAGs), according to some implementations of the present disclosure.

PE ontologies can be organized, for example, as directed acyclic graphs (DAGs) that include connected root nodes, internal nodes, and leaf nodes. Distances between nodes (for example, meaning relatedness between nodes) can be calculated based on similarity, search, or inference. Schematically, the topological ordering of DAGs can be represented (as shown in FIG. 3) as circles connected by graph edges (representing data) and arrows depicting semantic relations between the edges.

Referring again to FIG. 2A, in a data abstraction layer 206 (step 3), components of ontological frameworks (for example, including Things, Events, and Methods) can be built. The ontological frameworks can represent building blocks of the PE system including, for example, queries 216a, ontologies 216b, metadata 216c, and data mapping 216d.

In a knowledge discovery layer 208 (step 4), a knowledge discovery engine can be built. The knowledge discovery layer 208 can use processes that include, for example, graph/network computation 218a, graph/network training and validation 218b, and graph representation learning 218c. The knowledge discovery engine can be specifically designed for massive PE systems data using various algorithms. A detailed implementation example of the main sub-steps of step 4 of FIG. 2A is presented in FIG. 7.

A recommendation and advisory systems layer 210 (step 5) can be built that is used to make recommendations and advisories. For example, the recommendation and advisory systems layer 210 can be built using smart agents that correspond to different stages of PE business cycle. The recommendation and advisory systems layer 210 can use agents including, for example, a reservoir monitoring agent 220a, a surveillance agent 220b, a model calibration agent 220c, a production optimization agent 220d, a field development planning agent 220e, and a risk mitigation agent 220f. Building the recommendation and advisory systems layer can include combining smart agents, corresponding to different stages of PE business cycle. In some implementations, the agents 220a-220f can be implemented as described with reference to FIGS. 10-14.

The reservoir monitoring agent 220a can perform smart wells ICV/ICD management, oil recovery management (smart IOR/EOR), and well IPR/VLP, for example. The surveillance agent 220b can perform, for example, calculation of key process indicators (KPIs), production losses and downtime, quick production performance diagnostics, and short-term predictions. The model calibration agent 220c can perform, for example, uncertainty quantification (UQ), assisted history matching (AHM), and forecasting.

The production optimization agent 220d can perform, for example, closed-loop RM, production analytics, and injection allocation optimization. The field development planning agent 220e can perform, for example, optimal well placement, artificial lift optimization (for example, electrical submersible pumps (ESPs) and gas lifts (GLs)), and ultimate recovery (UR) maximization and optimal sweep. The risk mitigation agent 220f can perform, for example, probabilistic scenario analysis, portfolio analysis, and minimize risk (for example, to maximize return).

Figure 2B:
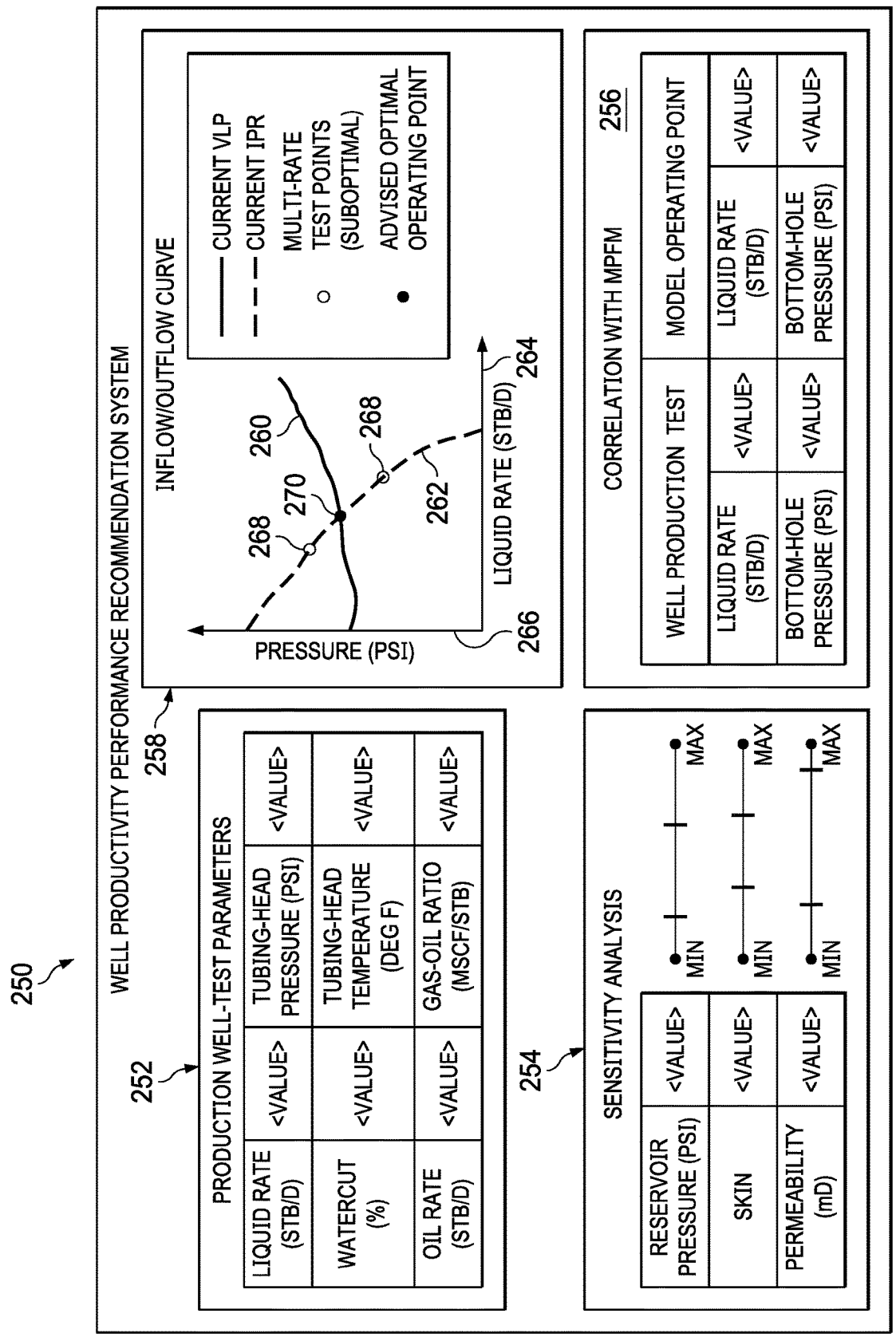
FIG. 2B is a screenshot showing an example of a user interface for a well productivity performance recommendation system, according to some implementations of the present disclosure.

FIG. 2B is a screenshot showing an example of a user interface 250 for a well productivity performance recommendation system, according to some implementations of the present disclosure. In some implementations, recommendations/advisories can be presented to the user using the user interface 250, and the information can be used by the user, for example, to make changes in production. The information can be generated by sub-systems of the well productivity performance recommendation system, for example. A representation learning system can learn information, for example, on wellbore damage (skin), equipment wear, multiphase-flow correlations (for example, from multiphase flow meter or MPFM) from the PE network/database containing many well modeling iterations (for example, using steady-state nodal analysis) performed across many assets. A recommendation/advisory system (for example, including smart agents) can execute sensitivity analysis, evaluate well productivity performance, recommend choke and/or artificial lift settings (for example, vertical lift performance (VLP)) to maintain optimal operating point (for example, inflow performance relationship (IPR)), and update well models.

A production well-test parameters information area 252 can be used to display current values, for example, of liquid rate, watercut, oil rate, tubing head pressure, tubing head temperature, and gas-oil ratio. A sensitivity analysis information area 254 can be used to display minimum and maximum range values for reservoir pressure, skin, and permeability. A correlation with MPFM information area 256 can be used to display well production test data (for example, liquid rate and bottom-hole pressure) and model operating point data (for example, liquid rate and bottom-hole pressure). An inflow/outflow curve 258 can be used to display plots including a current VLP plot 260 and a current IPR plot 262 (relative to a liquid rate axis 264 and a pressure axis 266). The plots can include multi-rate test points 268 and an advised optimal operating point 270.

FIG. 3 is a graph showing an example of a topological ordering 300 of directed acyclic graphs (DAGs), according to some implementations of the present disclosure. For example, in the topological ordering 300, circles 302 are used to depict graph nodes (or data) and arrows 304 are used to depict semantic relations between the nodes. The edges depicted in FIG. 3 include edges occurring earlier in the ordering (upper left) to later in the ordering (lower right). A DAG can be said to be acyclic if the DAG has an embedded topological ordering.

The present disclosure presents schematic examples of three different OFs pertaining to PE systems data, represented in the form of DAGs (with increasing graph feature complexity). For example, an OF/DAG corresponding to the process of well flow rate estimation is presented in FIG. 4, an OF/DAG corresponding to the process of estimation of ultimate recovery (EUR) is presented in FIG. 5, and an OF/DAG corresponding to the process of dynamic calibration of reservoir simulation model is presented in FIG. 6.

Figure 4:
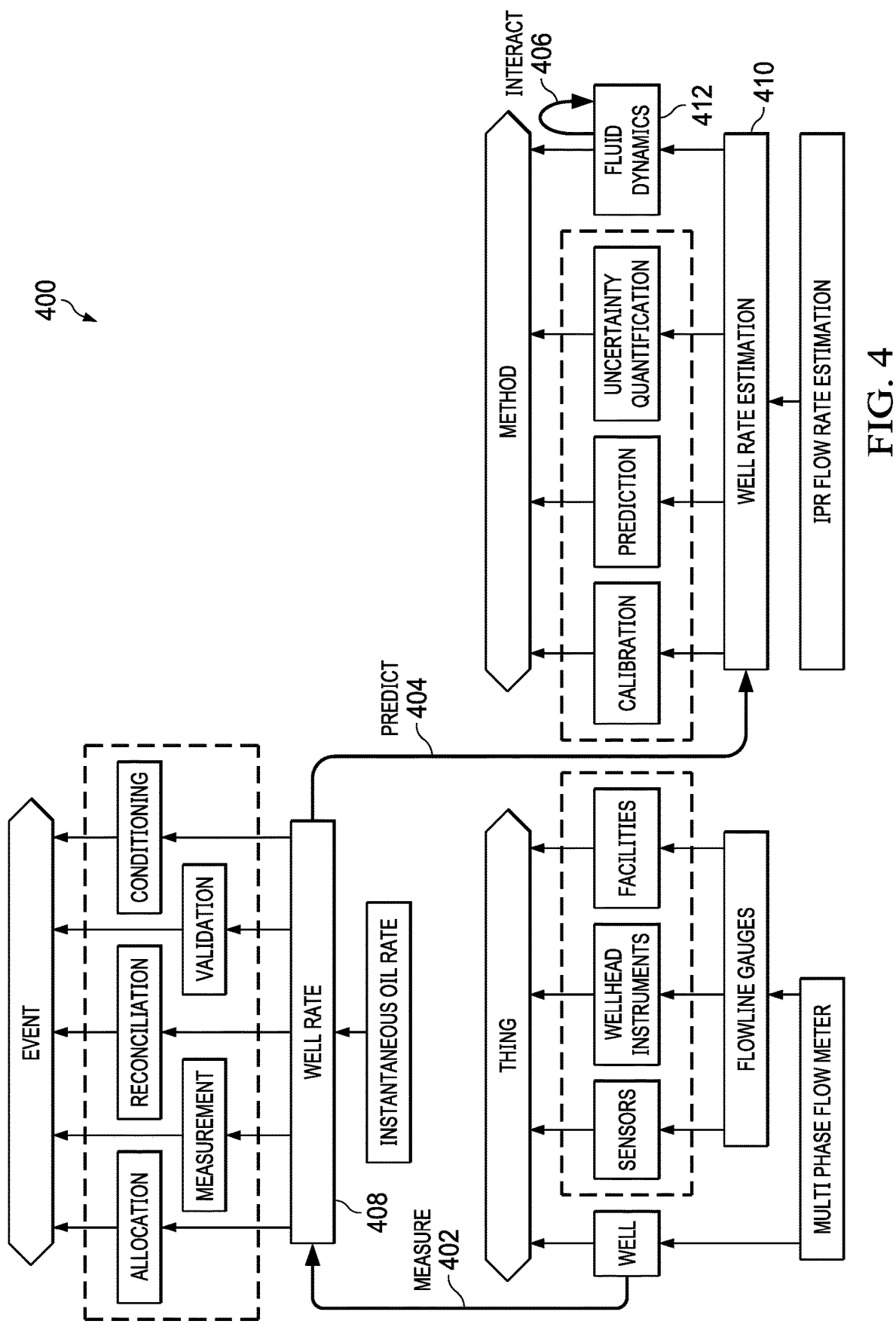
FIG. 4 is a network diagram of an example of a network for the ontological framework (OF)/DAG corresponding to the process of well flow rate estimation, according to some implementations of the present disclosure.
Figure 5:
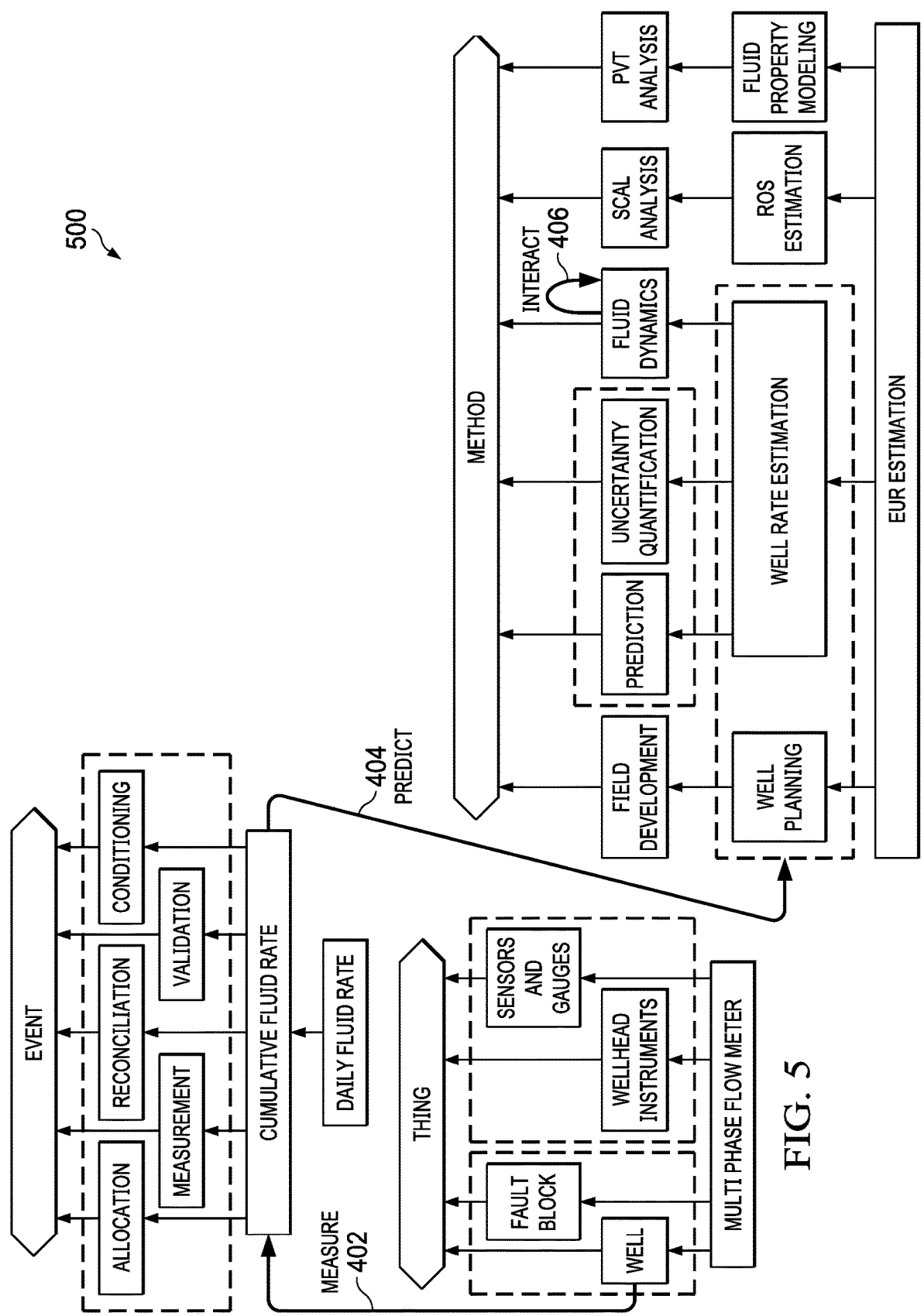
FIG. 5 is a network diagram of an example of a network for the OF/DAG corresponding to the process of estimation of ultimate recovery (EUR), according to some implementations of the present disclosure.
Figure 6:
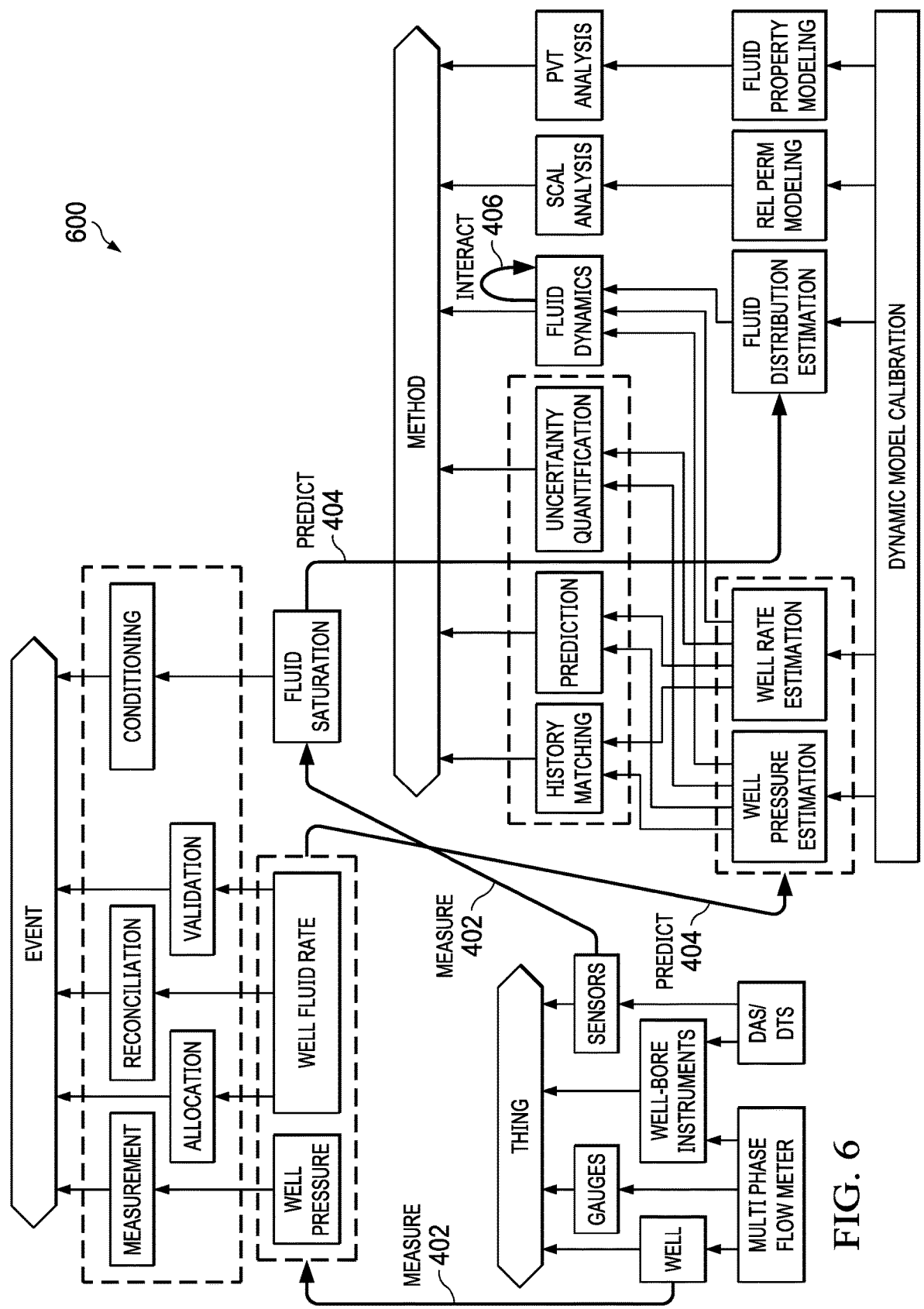
FIG. 6 is a network diagram of an example of a network for the OF/DAG corresponding to the process of dynamic calibration of a reservoir simulation model, according to some implementations of the present disclosure.

FIG. 4 is a network diagram of an example of a network 400 for the ontological framework (OF)/DAG corresponding to the process of well flow rate estimation, according to some implementations of the present disclosure. Semantic relationships between DAGs data points, labeled as Measure 402, Predict 404, and Interact 406, are represented in FIGS. 4-6 using thick arrows. As shown by the thick arrows, well rate 408 can be measured by a multiphase flow meter (MPFM) (associated with the well), and well rate estimation 410 can be a method for predicting the well rate. Fluid dynamics 412 calculations can be performed with the reservoir simulator, which can represent a non-linear estimator of physical interaction phenomena between model grid properties and fluid properties.

FIG. 5 is a network diagram of an example of a network 500 for the OF/DAG corresponding to the process of estimation of ultimate recovery (EUR), according to some implementations of the present disclosure. The network 500 is similar to the network 400 of FIG. 4, including the same data points labeled as Measure 402, Predict 404, and Interact 406. However, the networks 400 and 500 include different sets of nodes associated with different types of processing (for example, well flow rate estimation versus EUR).

FIG. 6 is a network diagram of an example of a network 600 for the OF/DAG corresponding to the process of dynamic calibration of a reservoir simulation model, according to some implementations of the present disclosure. The network 600 is similar to the network 400 of FIG. 4 and the network 500 of FIG. 5. The network 600 includes multiple data points labeled as Measure 402, Predict 404, and Interact 406. However, the network 600 includes different sets of nodes associated with different types of processing (for example, the process of dynamic calibration of the reservoir simulation model instead of processing associated with well flow rate estimation versus EUR of networks 400 and 500, respectively).

Tables 2 and 3 provide examples for the classification of graph features for graph nodes and graphs edges, respectively, for use in large-scale PE systems data. In some implementations, identifying components of ontological frameworks (for example, including Things, Events, and Methods) can be done using step 3 of FIG. 2A. The components can be used as building blocks of computational graph nodes and edges.

TABLE 2

Example classification of PE systems graph Nodes

| Graph Features | Graph Node | Node Label |
| --- | --- | --- |
| Things | Well | T1 |
|  | Gauges | T2 |
|  | Well-bore Instruments | T3 |
|  | Sensors | T4 |
| Events | Well Pressure | E1 |

TABLE 2-continued

Example classification of PE systems graph Nodes

| Graph Features | Graph Node | Node Label |
| --- | --- | --- |
|  | Well Fluid Rate | E2 |
|  | Fluid Saturation | E3 |
| Methods | Well Pressure Estimation | M1 |
|  | Well Rate Estimation | M2 |
|  | Fluid Distribution Estimation | M3 |
|  | Fluid Properties modeling | M4 |
|  | Relative Permeability modeling | M5 |

TABLE 3

Example classification of PE systems graph Edges

| Graph Features | Graph Edge | Aggregation Label |
| --- | --- | --- |
| Events | Measurement | EAgg1 |
|  | Allocation | EAgg2 |
|  | Reconciliation | EAgg3 |
|  | Validation | EAgg4 |
|  | Conditioning | EAgg5 |
| Methods | History Matching | MAgg1 |
|  | Prediction | MAgg2 |
|  | Uncertainty Quantification | MAgg3 |
|  | Fluid Dynamics | MAgg4 |
|  | PVT Analysis | MAgg5 |
|  | SCAL Analysis | MAgg6 |

FIG. 7 is a flow diagram of an example of a process 700 for building a knowledge discovery engine, according to some implementations of the present disclosure. For example, the process 700 can be used to implement step 4 of FIG. 2A.

At 702, meaningful graph features, as nodes and edges, are defined. Tables 2 and 3 provide examples of classifications of graph features used for large-scale PE systems data. Step 702 can be done, for example, after identifying components of ontological frameworks built in step 3 of FIG. 2A (for example, including Things, Events, and Methods) as building blocks of computational graph nodes and edges.

Figure 8A:
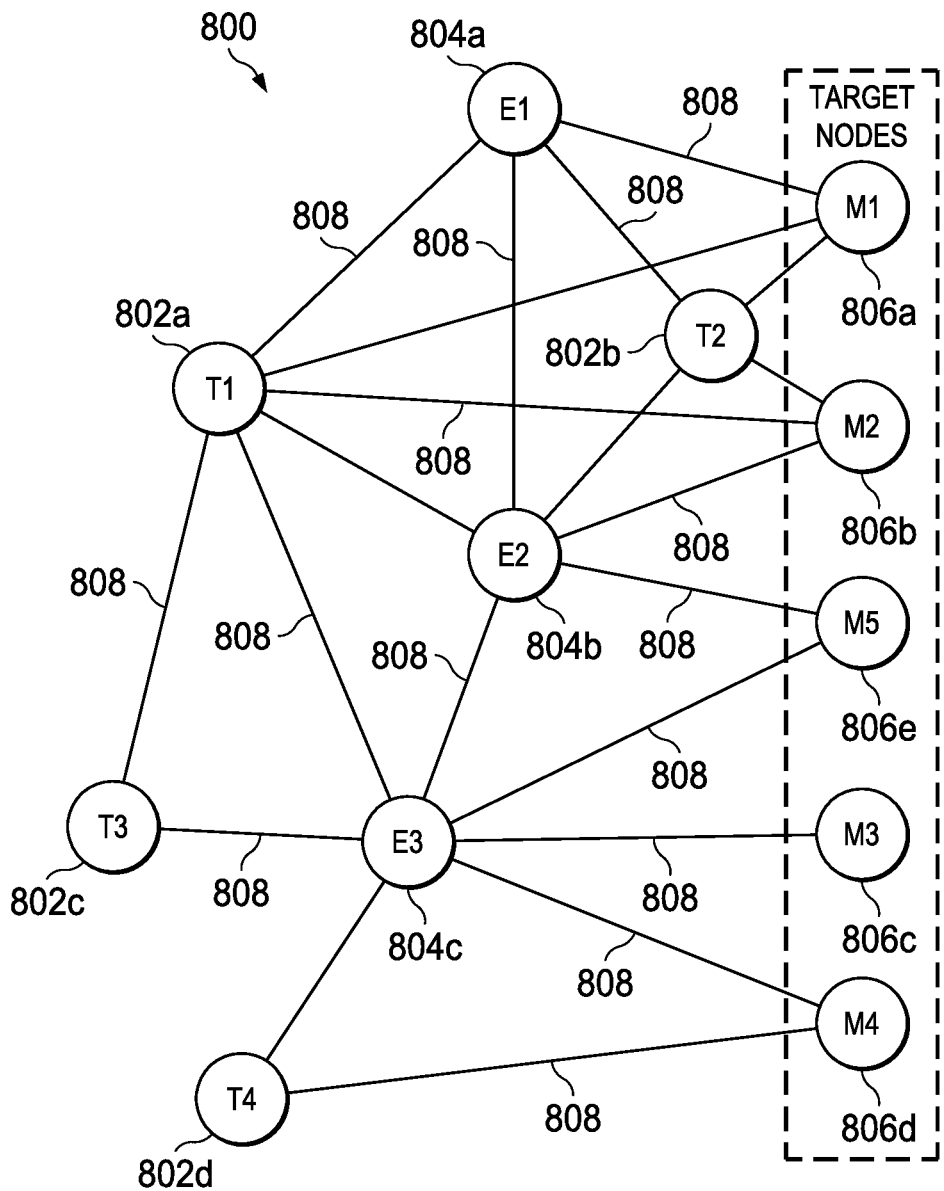
FIG. 8A is a network diagram showing an example of a computation graph corresponding to a specific task of PE systems data representation learning, according to some implementations of the present disclosure.

At 704, the computation graph corresponding to specific task of PE systems data representation learning is generated. For example, components of ontological frameworks built in step 3 of FIG. 2A (for example, including Things, Events, and Methods) can be associated with building blocks of computational graph nodes and edges. In FIG. 8A, an example is given of computation graph attributed to dynamic simulation model calibration.

Figure 9:
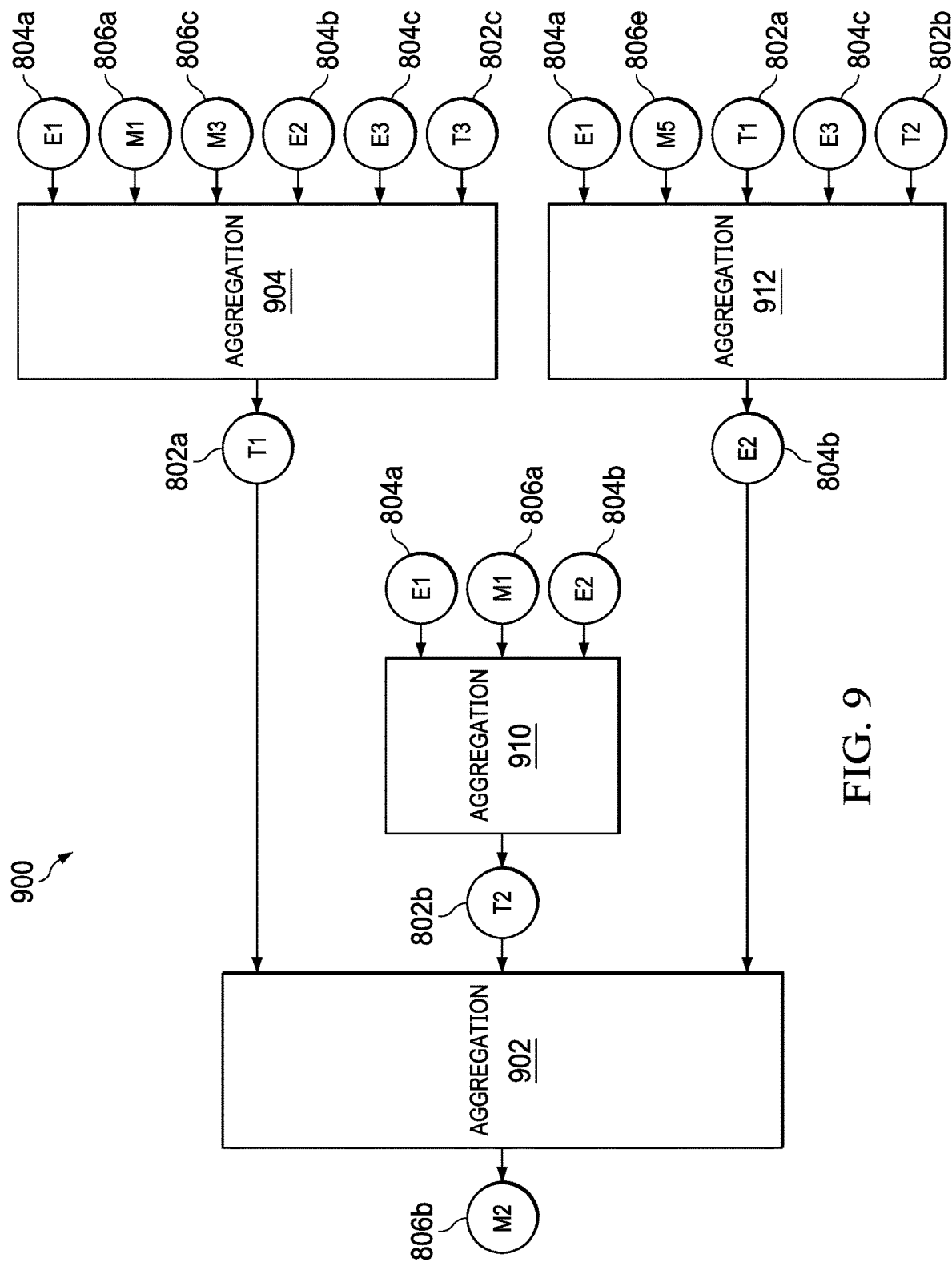
FIG. 9 is an example of a computation graph corresponding to an example of graph representation learning process for well rate estimation, according to some implementations of the present disclosure.

At 706, a graph node aggregation function is identified and deployed as illustrated in FIG. 9). For example, graph recursive neural networks (GRNN) can be identified as aggregation function for text data (for example, using PE systems unstructured data). Graph convolutional neural networks (GCNN) and generative adversary networks (GAN) can be identified as aggregation function for grid-based data (for example, using reservoir simulation grid properties). Time-varying graphical lasso (TGL) techniques can be identified for aggregation of time series (for example, using pressure and fluid rate response profiles).

At 708 the aggregation function is trained. For example, the aggregation function can be trained using historical PE data.

At 710, deep representation learning (DRL) is performed with trained aggregation function. After the completion of step 4 of FIG. 2A, the process can continue at the recommendation and advisory systems layer (step 5 of FIG. 2A).

FIG. 8A is a network diagram showing an example of a computation graph 800 corresponding to a specific task of PE systems data representation learning, according to some implementations of the present disclosure. For example, the computation graph 800 provides an example of a computation graph attributed to dynamic simulation model calibration. The computation graph 800 includes Thing nodes 802a-802d, Event nodes 804a-804c, and Method nodes 806a-806e. Thing (T) nodes 802a-802d and Event (E) nodes 804a-804c represent nodes of a knowledge graph used, for example, in dynamic simulation model calibration. Method (M) nodes 806a-806e represent target nodes combined into graph representation used, for example, in dynamic simulation model calibration. Thing nodes 802a-802d, Event nodes 804a-804c, and Method nodes 806a-806e can be interconnected by graph edges 808, where the edges 808 represent an aggregation function.

Figure 8B:
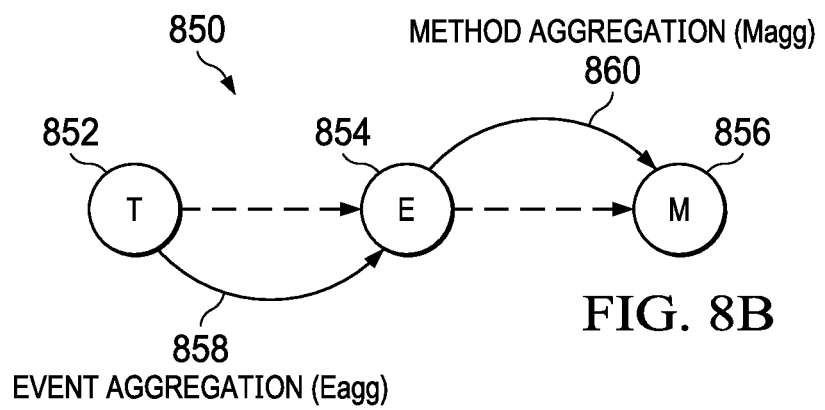
FIG. 8B is a network diagram showing an example of a network showing aggregations, according to some implementations of the present disclosure.

FIG. 8B is a network diagram showing an example of a network 850 showing aggregations, according to some implementations of the present disclosure. The network 850 shows an event aggregation (Eagg) 858 between a Thing node 852 and an Event node 854. The network 850 also shows a method aggregation (Magg) 860 between the Event node 854 and a Method node 856. The Eagg 858 and the Magg 860 provide examples of aggregations associated with the Things, Events, and Methods of the network 800. Tables 2 and 3 include notations that correspond to FIGS. 8A and 8B.

FIG. 9 is an example of a computation graph 900 corresponding to an example of graph representation learning process for well rate estimation, according to some implementations of the present disclosure. For example, the computation graph 900 can correspond to node M2 806b in FIG. 8A. At the highest level, information from nodes T1 802a and T2 802b is aggregated and associated with method node M2, which corresponds to well rate estimation. Specifically, aggregation function 902 for node M2 806b, corresponding to well rate estimation, for example, is performed using three input nodes. The three input nodes include Thing nodes T1 802a and T2 802b (corresponding to a well and gauges in the ontological framework of FIG. 4) and Event node E2 804b.

In general, information at node labels E1, M1, M3, E2, E3 and T3 (see Table 2) is aggregated by aggregation function 904 and associated with the well node represented by Thing node T1 802a. Examples of aggregation functions are defined in the description of FIG. 7, and events and methods represented in the aggregation are listed in Table 3.

In general, information at node labels E1, M1, and E2 (see Table 2) is aggregated in data aggregation 910 and associated with a gauges node represented by T2. Examples of aggregation functions are defined in the description of FIG. 7, and events and methods represented in the aggregation are listed in Table 3.

In general, information at node labels E1, M5, T1, E3 and T2 (see Table 2) is aggregated in data aggregation 912 and associated with a well node represented by Event node E2 804b. Examples of aggregation functions are defined in the description of FIG. 7, and events and methods represented in the aggregation are listed in Table 3.

Aggregation can be performed by learning network/graph representations. Example is given for the Well Rate Estimation (M2), by learning PE system network/graph representations, to predict a well Productivity Index (PI) of a newly-drilled well, aggregated by aggregation function 902. Table 2 provides examples of PE systems graph nodes labeling and notations. Table 3 provides examples of PE systems graph edges labeling and notations.

As indicated in FIG. 9, the input of aggregation function 902 connects three graph edges, feeding from: 1) Thing node T2 (802b), for example, represented by a permanent downhole gauge (PDG); 2) Thing node T1 (802a), for example, represented by a well; and 3) Event node E2 (804b), for example, represented by a well fluid rate. Since the output of aggregation function 902 is the method for estimating well rates (for example, including oil, water, and gas), the aggregation function itself can be represented by the Magg2 (prediction), which predicts the well productivity index (PI). One example representation of the Magg2 function is $PI=Q/(P_{res}-P_{fBHP})$, where Q corresponds to a fluid rate (for example, oil, water, and gas), $P_{res}$ corresponds to a reservoir pressure, and $P_{fBHP}$ corresponds to a well flowing bottom-hole pressure (fBHP). Aggregation of each node T1 (802a), T2 (802b), and E2 (804b) is respectively described in detail.

Aggregation of node T1 (802a) with function 904 starts with reading of input data from nodes represented by the following events, methods, and things. Event E1 corresponds to a well flowing bottom-hole pressure (fBHP). E1 can be measured, for example, by a permanent downhole pressure gauge. Event E2 corresponds to a well fluid rate Q. E2 can be measured, for example, using a multi-phase flow meter (MPFM). Method M1 corresponds, for example, to a well overbalanced pressure estimation. Method M3 can correspond to a fluid distribution estimation, with representation, for example, from streamline-generated drainage regions. Event E3, corresponding to fluid saturation, can be calculated by a finite-difference reservoir simulator as a function of time throughout field production history. Thing T3, corresponding to a well-bore instrument, can be a distributed acoustic sensor (DAS) or a distributed temperature sensor (DTS).

For individual nodes previously described, feeding the aggregation function 904 can include receiving information or data from neighboring nodes in the network that are interconnected with adjacent edges. Since aggregation function 904 is an input graph node of Things (for example, T1, representing the liquid-producing well), the aggregation function 904 can correspond to Allocation, Eagg2. For example, Eagg2 correctly allocates the fluids gathered at well-gathering stations (for example, gas-oil separation plants (GOSP)) onto individual wells connected using surface production network systems. One such example of an aggregation function, corresponding to well-production Allocation, is a data reconciliation method. The data reconciliation method can be a statistical data processing method that calculate a final well-production value, for example, when the two or more different sources and measurement are available.

Aggregation of node T2 (802b) with function 910 starts with reading of input data from the following nodes. Event E1 corresponds to a well flowing bottom-hole pressure (fBHP), measured by, for example, a permanent downhole pressure gauge. Event E2 corresponds to a well fluid rate Q, measured by, for example, a multi-phase flow meter (MPFM). Method M1, for example, corresponds to well overbalanced pressure estimation. However, since aggregation function 910 is an input to a graph node of Things (T2), representing well measurement gauges, the aggregation function 910 corresponds to Measurement, Eagg1. An example of aggregation function Eagg1 is the numerical model for the calculation of inflow performance relationship (IPR) and well vertical lift performance (VLP). An example of representation learned from the IPR/VLP curve(s) is the optimal operating point corresponding to the cross-point between IPR curve and tubing performance curve.

It is noted that the three nodes E1, E2, and M1 feeding the aggregation function 910 also represent a subset of nodes feeding the aggregation function 904. This illustrates that individual representation learning or aggregation functions connected in a complex network or graph can share or complement nodal information from neighboring nodes using network adjacency.

Aggregation of node E2 (804b) with function 912 starts with reading of input data from nodes represented by the following nodes. Event E1 corresponds to well flowing bottom-hole pressure (fBHP), measured by, for example, a permanent downhole pressure gauge. Event E3 corresponds to fluid saturation, calculated, for example, by a finite-difference reservoir simulator as a function of time throughout field production history. Method M5 corresponds to relative permeability modeling, used to learn representations of fractional-phase fluid movement (for example, water, oil, and gas) in the presence of other fluids. Thing T1 represents, for example, the liquid-producing well. Thing T2 represents, for example, well measurement gauges, such as a permanent downhole gauge (PDG).

The aggregation function 912 is an input to a graph node of Events (E2), representing a time-dependent well fluid rate profile. As such, the aggregation function 912 can correspond, for example, to the following single function or a combination of the following functions: a data validation function, Eagg4; a data conditioning and imputation function, Eagg5; and a special core analysis (SCAL), Magg6. The data validation, Eagg4, can be, for example, a QA/QC cleansing and filtering of raw time-dependent well fluid rate measurements. The measurements can be acquired from well measurement gauges, as represented with network/graph edge connectivity to nodes T1 and T2. Examples of data validation functions include, for example, rate-of-change recognition, spike detection, value-hold and value-clip detection, out-of-range detection, and data freeze detection. The data conditioning and imputation, Eagg5, can use raw time-dependent well fluid rate measurements. The measurements can be acquired from well measurement gauges, as represented with network/graph edge connectivity to nodes T1 and T2. Examples of data validation functions include, for example, simple averaging (or summarizing), extrapolation following trends and tendencies, data replacement by data-driven analytics (such as maximum-likelihood estimation), and physics-based calculations (such as virtual flow metering). The special core analysis (SCAL), Magg6, can use interpretation of lab core experiments (for example, centrifuge, mercury-injection capillary pressure (MICP)) to derive relative permeability models as representations of fractional-phase fluid movement (water, oil and gas) in the presence of other fluids.

The event nodes E1 and E3 feeding the aggregation function 912 also represent a subset of nodes feeding the aggregation function 904. Moreover, the two Things nodes T1 and T2 feeding the aggregation function 912 also represent the aggregated node of the aggregation functions 904 and 910. This illustrates that individual representation learning or aggregation functions connected in a complex network or graph frequently share or complement nodal information from neighboring nodes using network adjacency and topological ordering of directed acyclic graphs (DAG), as illustrated in FIG. 3.

FIG. 10 is a flow diagram of an example of a smart agent process 1000 for well inflow performance relationship/vertical lift performance (IPR/VLP) performance, according to some implementations of the present disclosure. The smart agent process 1000 can be implemented with a reservoir monitoring agent for calculating well IPR/VLP performance (for example, IPR/VLP smart agent 1001).

At 1002, multi-rate well test data is declared in real time. At 1004, data filtering and conditioning is performed with a series of algorithms that automatically clean, eliminate spikes, detect frozen data, and estimate the average and standard deviation of the data. Data conditioning functions can include, for example, rate of change, range checks, freeze checks, mean and standard deviation, filtering, and stability check. At 1006, data and the well model are updated, for example, using nodal analysis. At 1008, well tuning and diagnostics are performed, for example, using nodal analysis. At 1010, an optimal well output is recommended.

FIG. 11 is a flow diagram of an example of a smart agent process 1100 for quick production performance diagnostics (QPPD), according to some implementations of the present disclosure. For example, the smart agent process 1100 can be implemented using a surveillance agent for QPPD (for example, QPPD smart agent 1101).

At 1102, real-time well KPIs are generated. For example, critical well thresholds and constraints are generated and compared with current well conditions (for example, minimum and maximum pressure targets, and liquid and gas production constraints). At 1104, well losses and gains are calculated. Production deviations are calculated instantaneously (daily to account for well-level losses) and cumulatively (total losses and gain per day, month, and year). For example, the virtual metering system based on nodal modeling can be used to estimate well liquid production and well watercut. At 1106, well events are tracked in real-time using connectivity to sensor network systems (for example, supervisory control and data acquisition (SCADA) or Internet of Things (IoT)). Well events lists can contain, for example, well workovers, shut-ins, measurements and other manipulations. At 1108, correlations between well events are determined. For example, spatial correlations between water injection wells and producing wells can be estimated by pattern analysis and by using streamline modeling. Further, clustering techniques can be used to group wells based on dynamic response (dis)similarity. At 1110, short-term well production can be predicted, for example, the short-term well production response can be generated by using predictive modeling and machine learning (ML).

Figure 12:
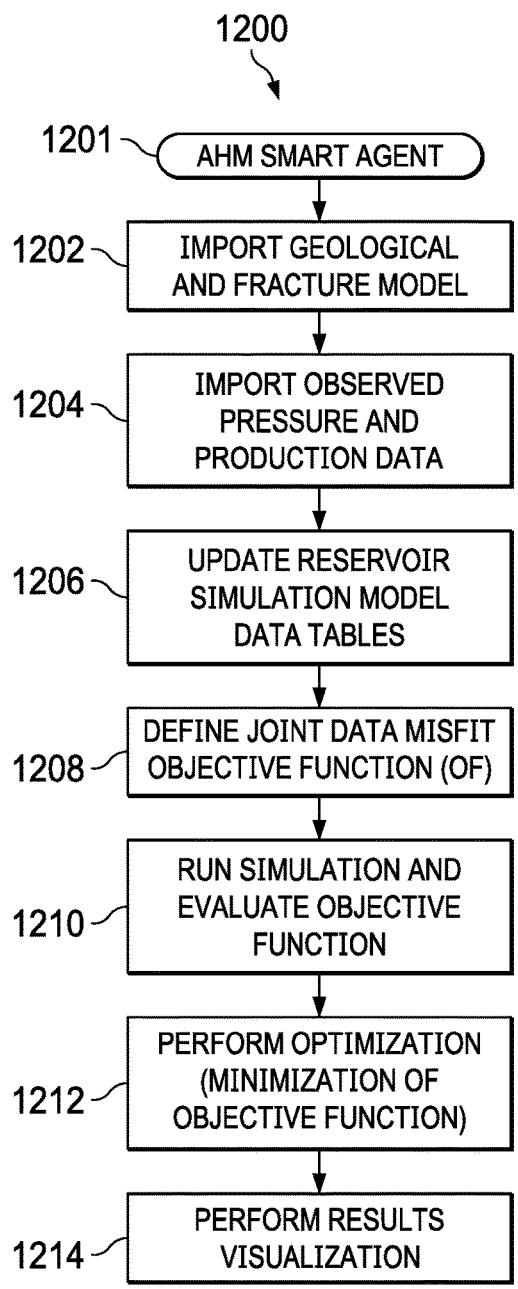
FIG. 12 is a flow diagram of an example of a smart agent process for computer-assisted history matching (AHM), according to some implementations of the present disclosure.

FIG. 12 is a flow diagram of an example of a smart agent process 1200 for computer-assisted history matching (AHM), according to some implementations of the present disclosure. The smart agent process 1200 can be implemented, for example, using an AHM smart agent 1201, which can perform the following steps.

At 1202, the geological and fracture models (for example, three-dimensional (3D) structural grids with associated subsurface properties) are imported. At 1204, the observed well pressure and production data are imported. At 1206, the reservoir simulation model data tables are updated with imported data. At 1208, the agent builds a joint data misfit objective function (OF), which can combine prior model terms (corresponding to the misfit reservoir subsurface properties of geological and fracture models) and likelihood terms (corresponding to the misfit between the observed and calculated dynamic pressure and production data). At 1210, the misfit OF is validated using a non-linear estimator, namely the reservoir simulator, for dynamic response in terms of well pressure and production data. At 1212, the process of optimization is performed with the objective to minimize the misfit OF and obtain an acceptable history match between the observed and simulated data. Optimization process can be a deterministic or stochastic and can be performed on a single simulation model realization or under uncertainty, using an ensemble of statistically diverse simulation model realizations. At 1214, the agent visualizes the results of ATM optimization process as time series, aggregated reservoir grid properties, and quality maps.

Figure 13:
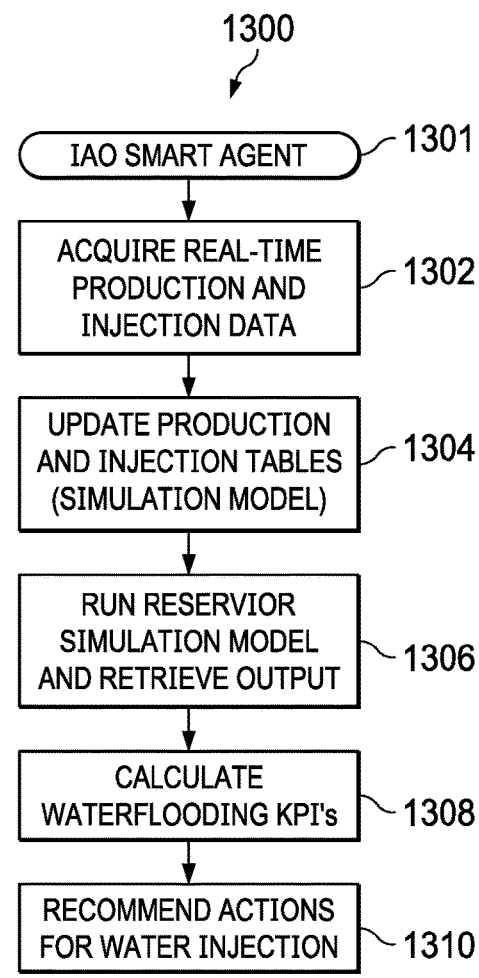
FIG. 13 is a flow diagram of an example of a smart agent process for injection allocation optimization (IAO), according to some implementations of the present disclosure.

FIG. 13 is a flow diagram of an example of a smart agent process 1300 for injection allocation optimization (IAO), according to some implementations of the present disclosure. The smart agent process 1300 can be implemented, for example, using a production optimization agent for IAO (for example, IAO smart agent 1301, which can perform the following steps).

At 1302, data associated with real-time well injection and production is acquired, for example, using connectivity to sensor network systems (for example, SCADA or IoT). At 1304, the acquired data is used to update the production and injection tables of the operational reservoir simulation model. At 1306, the reservoir simulation model is executed with updated injection and production data, and the simulation run output is retrieved. Different scenarios of waterflooding management can include, for example, using voidage replacement ratio (VRR) constraints or reservoir pressure maintenance control. At 1308, waterflooding KPIs are calculated, including, for example, VRR time series and cumulative behavior, reservoir nominal pressure behavior, fluid displacement, and volumetric efficiency. At 1310, the proactive recommendation is generated to improve water injection and fluid production strategy.

Figure 14:
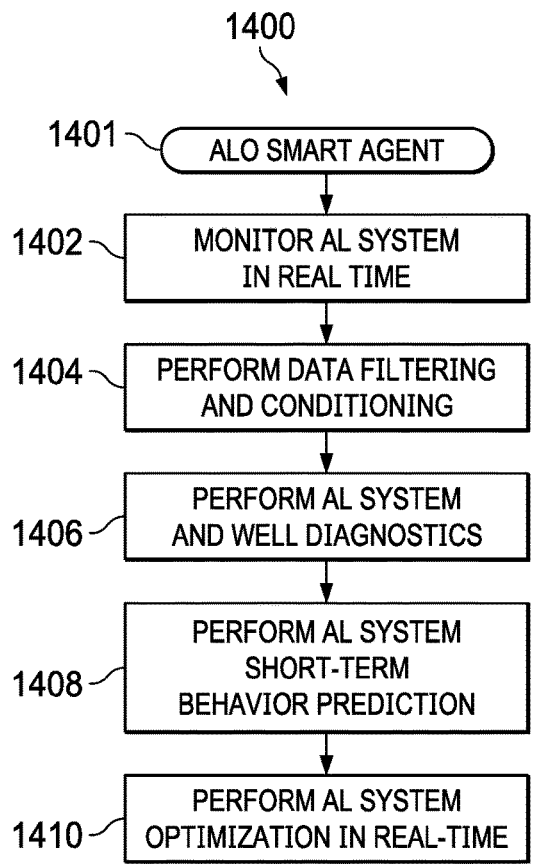
FIG. 14 is a flow diagram of an example of a smart agent process for artificial lift optimization (ALO), according to some implementations of the present disclosure.

FIG. 14 is a flow diagram of an example of a smart agent process 1400 for artificial lift optimization (ALO), according to some implementations of the present disclosure. The smart agent process 1400 can be implemented, for example, using a field development planning (FDP) agent for ALO (for example, using ALO smart agent 1401, which can perform the following steps).

At 1402, the ALO agent retrieves the data from the real-time monitoring system that interactively collects data on ALO system's performance. For example, in the case of electric submersible pump (ESP) equipment, the monitoring system can collect information from the variable speed drive and pressure and temperature sensors at intake and discharge of the pump, liquid rate, temperature. At 1404, data filtering and conditioning is performed with a series of algorithms that automatically clean, eliminate spikes, detect frozen data, and estimate the average and standard deviation of the data. Data conditioning functions can include for example: rate of change, range checks, freeze checks, mean and standard deviation, filtering, and stability check. At 1406, the ALO agent automatically updates and calculates the new operating point of the ESP, based on the information given at real-time conditions. The agent automatically tunes the model to minimize the error between measured and calculated flow rate and flowing bottom-hole pressure (FBHP) by adjusting unknown parameters, such as skin and ESP wear factor. At 1408, the ALO agent uses predictive modeling to predict potential erratic behavior of the ESP system, utilizing short-term predictive machine learning models, such as neural networks and generates proposals for preventive maintenance. At 1410, the optimum operating points of the ESP system is calculated, from which the agent automatically select the operating point as the most adequate to the specific operating condition.

Figure 15:
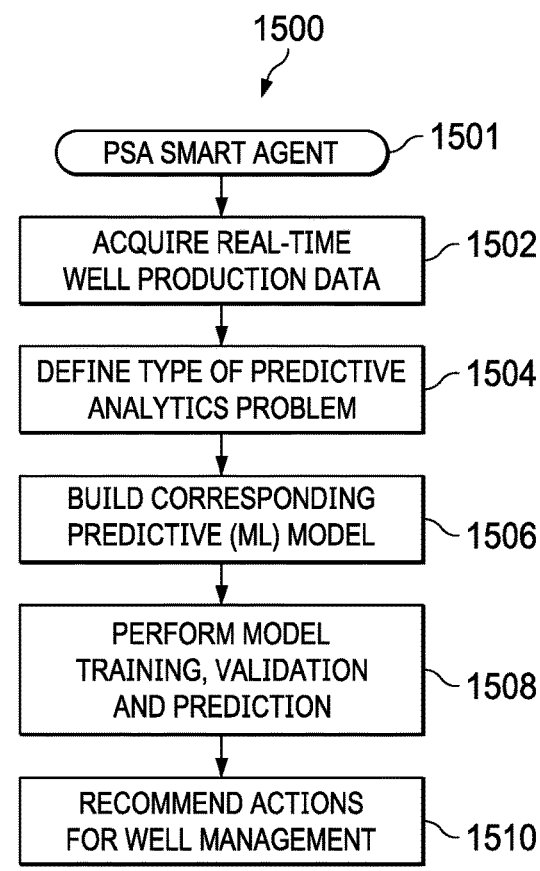
FIG. 15 is a flow diagram of an example of a smart agent process for probabilistic scenario analysis (PSA), according to some implementations of the present disclosure.

FIG. 15 is a flow diagram of an example of a smart agent process 1500 for probabilistic scenario analysis (PSA), according to some implementations of the present disclosure. The smart agent process 1500 can be implemented, for example, using a risk mitigation agent for probabilistic scenario analysis (PSA) (for example, a PSA smart agent 1501, which can perform the following steps.)

At 1502, the real-time well production data is acquired, for example, using connectivity to sensor network systems such as SCADA and IoT. At 1504, the agent defines the type of predictive analytics problem evaluated in PSO process. For example, a problem that is related to ESP predictive maintenance scenarios (for example, to identify the potential root-cause variables and attributes that can potentially cause erratic ESP behavior) can be categorized as a classification problem. Alternatively, if an objective is to identify wells with problematic performance in terms of production rates, then the problem can be categorized as a continuous or regression problem. At 1506, the agent builds a corresponding predictive model or identifies the model from a library of predefined machine learning (ML) models. At 1508, the agent performs training, validation, and prediction with the selected ML model. At 1510, the agent recommends actions for well management and maintenance to optimize production. For example, when regression decision trees used as a predictive ML model, individual scenarios leading to the lowest well production can be isolated by automatically tracing a sequence of steps propagating through the nodes and edges of the decision tree. Similarly, the sequence of actions leading to a scenario yielding the highest production can be automatically identified as well.

Figure 16:
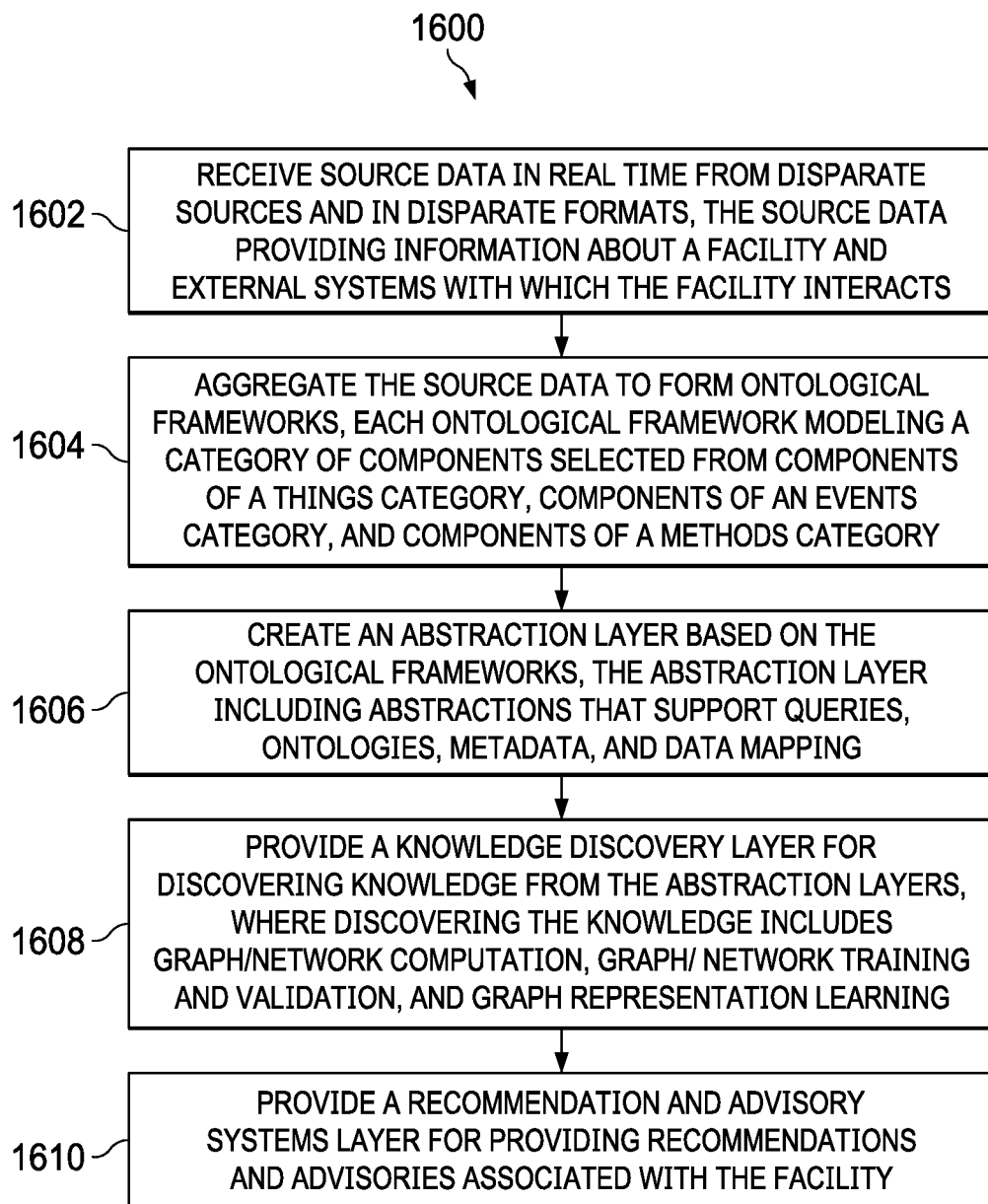
FIG. 16 is a flowchart of an example method for providing recommendations and advisories using OFs generated from aggregated data received from disparate data sources, according to some implementations of the present disclosure.

FIG. 16 is a flowchart of an example method 1600 for providing recommendations and advisories using OFs generated from aggregated data received from disparate data sources, according to some implementations of the present disclosure. For clarity of presentation, the description that follows generally describes method 1600 in the context of the other figures in this description. However, it will be understood that method 1600 can be performed, for example, by any suitable system, environment, software, and hardware, or a combination of systems, environments, software, and hardware, as appropriate. In some implementations, various steps of method 1600 can be run in parallel, in combination, in loops, or in any order.

At 1602, source data is received in real-time from disparate sources and in disparate formats. The source data provides information about a facility and external systems with which the facility interacts. The source layer 202, for example, can receive source data from the sources 212a-212f. The disparate formats of the source data can include, for example, structured data, unstructured data, data wrappers, and data wranglers. The facility receiving the source data can be a petroleum engineering facility or a remote facility in communication with the petroleum engineering facility, for example. From 1602, method 1600 proceeds to 1604.

At 1604, the source data is aggregated to form ontological frameworks. Each ontological framework models a category of components selected from components of a Things category, components of an Events category, and components of a Methods category. Aggregation can occur, for example, in the data aggregation layer 204. The Things category can include, for example, mechanical components including wells, rigs, facilities, sensors, and metering systems. The Events category can include, for example, manual and automated actions performed using the components of the Things category. The Methods category can include, for example, algorithms, workflows, and processes which numerically or holistically quantify the components of the events category. From 1604, method 1600 proceeds to 1606.

At 1606, an abstraction layer is created based on the ontological frameworks. The abstraction layer includes abstractions that support queries, ontologies, metadata, and data mapping. For example, the data abstraction layer 206 can generate abstractions from the data in the data aggregation layer 204. From 1606, method 1600 proceeds to 1608.

At 1608, a knowledge discovery layer for discovering knowledge from the abstraction layers is provided. Discovering the knowledge includes graph/network computation, which can provide inputs for graph/network training and validation, which in turn can provide inputs to graph representation learning. From 1608, method 1600 proceeds to 1610.

At 1610, a recommendation and advisory systems layer is provided for providing recommendations and advisories associated with the facility. The recommendation and advisory systems layer 210, for example, can execute agents such as the reservoir monitoring agent 220a, the surveillance agent 220b, the model calibration agent 220c, the production optimization agent 220d, the field development planning agent 220e, and the risk mitigation agent 220f. After 1610, method 1600 can stop.

In some implementations, method 1600 can further include steps for providing and using a user interface. For example, a user interface built on the recommendation and advisory systems layer 210 can be provided on a computer located at the facility or at a location remote from (but in communication with) the facility. The user interface can display recommendations and advisories generated by the recommendation and advisory systems layer 210, for example. The recommendations and advisories are based on current and projected conditions at a facility, such as information related to equipment, flow rates, and pressures. During interaction by a user using the user interface, a selection can be received from the user of the user interface. Changes to the facility can be automatically implemented based on the selection, such as changes in valve settings or other changes that can affect oil production at the facility.

Figure 17:
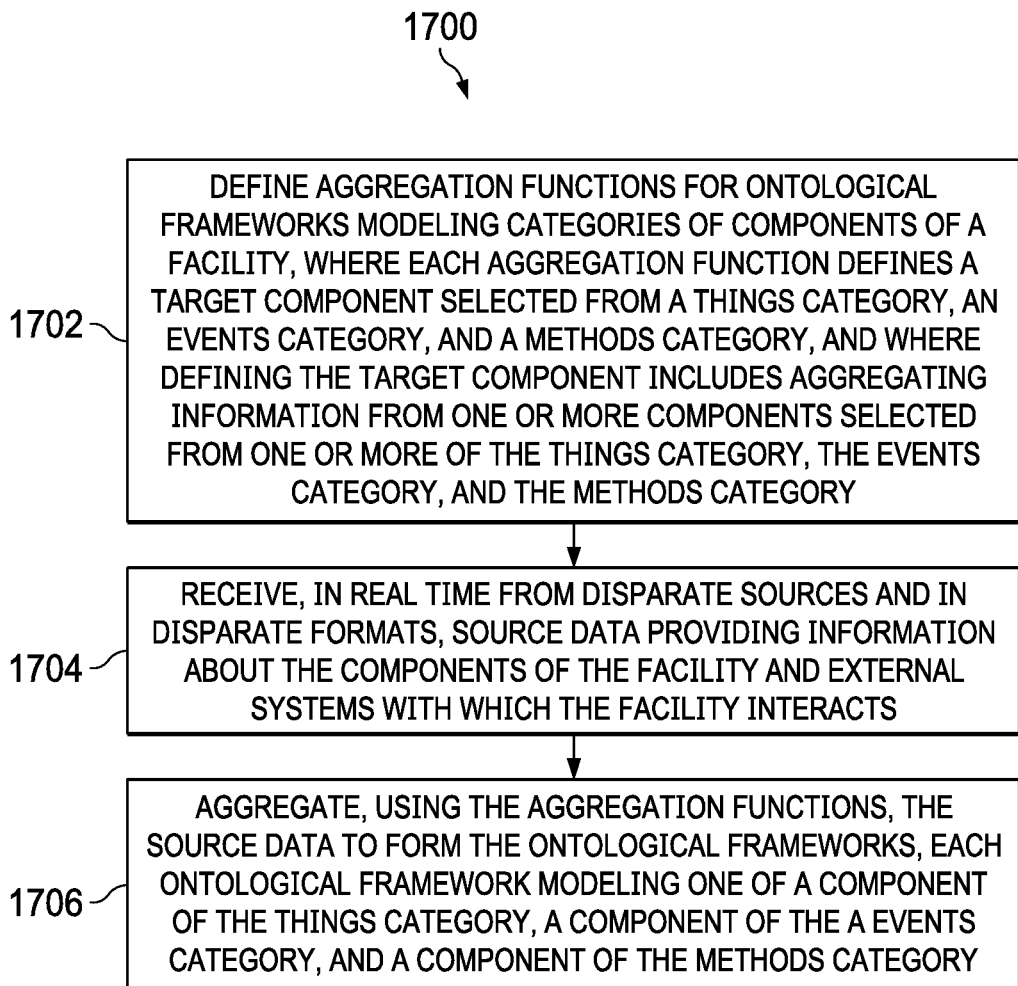
FIG. 17 is a flowchart of an example method for using aggregation functions to aggregate information for nodes in ontological frameworks, according to some implementations of the present disclosure.

FIG. 17 is a flowchart of an example method 1700 for using aggregation functions to aggregate information for nodes in ontological frameworks, according to some implementations of the present disclosure. For clarity of presentation, the description that follows generally describes method 1700 in the context of the other figures in this description. However, it will be understood that method 1700 can be performed, for example, by any suitable system, environment, software, and hardware, or a combination of systems, environments, software, and hardware, as appropriate. In some implementations, various steps of method 1700 can be run in parallel, in combination, in loops, or in any order.

At 1702, aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. For example, the aggregation functions described with reference to FIG. 7 can be defined. Examples of events and methods that can be used in aggregations are listed in Table 3. From 1702, method 1700 proceeds to 1704.

At 1704, source data is received in real-time from disparate sources and in disparate formats. The source data provides information about the components of the facility and external systems with which the facility interacts. The disparate formats of the source data can include, for example, structured data, unstructured data, data wrappers, and data wranglers. As an example, the source layer 202 can receive source data from the sources 212a-212f. From 1704, method 1700 proceeds to 1706.

At 1706, using the aggregation functions, the source data is aggregated to form the ontological frameworks. Each ontological framework models a component of the Things category, a component of the a Events category, or a component of the Methods category. For example, the description of FIG. 8B describes a network showing aggregations. After 1706, method 1700 can stop.

Figure 18:
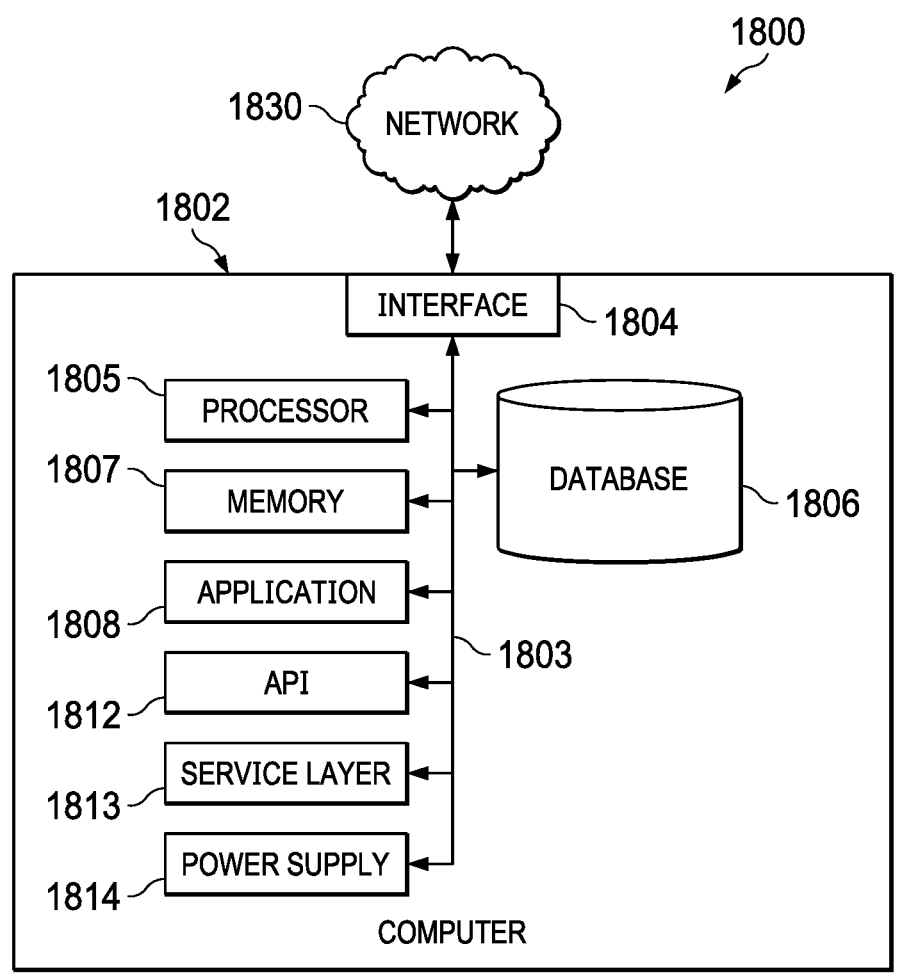
FIG. 18 is a block diagram illustrating an example computer system used to provide computational functionalities associated with described algorithms, methods, functions, processes, flows, and procedures as described in the present disclosure, according to some implementations of the present disclosure.

FIG. 18 is a block diagram of an example computer system 1800 used to provide computational functionalities associated with described algorithms, methods, functions, processes, flows, and procedures described in the present disclosure, according to some implementations of the present disclosure. The illustrated computer 1802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1802 can include input devices such as keypads, keyboards, and touch screens that can accept user information. Also, the computer 1802 can include output devices that can convey information associated with the operation of the computer 1802. The information can include digital data, visual data, audio information, or a combination of information. The information can be presented in a graphical user interface (UI) (or GUI).

The computer 1802 can serve in a role as a client, a network component, a server, a database, a persistency, or components of a computer system for performing the subject matter described in the present disclosure. The illustrated computer 1802 is communicably coupled with a network 1830. In some implementations, one or more components of the computer 1802 can be configured to operate within different environments, including cloud-computing-based environments, local environments, global environments, and combinations of environments.

At a high level, the computer 1802 is an electronic computing device operable to receive, transmit, process, store, and manage data and information associated with the described subject matter. According to some implementations, the computer 1802 can also include, or be communicably coupled with, an application server, an email server, a web server, a caching server, a streaming data server, or a combination of servers.

The computer 1802 can receive requests over network 1830 from a client application (for example, executing on another computer 1802). The computer 1802 can respond to the received requests by processing the received requests using software applications. Requests can also be sent to the computer 1802 from internal users (for example, from a command console), external (or third) parties, automated applications, entities, individuals, systems, and computers.

Each of the components of the computer 1802 can communicate using a system bus 1803. In some implementations, any or all of the components of the computer 1802, including hardware or software components, can interface with each other or the interface 1804 (or a combination of both), over the system bus 1803. Interfaces can use an application programming interface (API) 1812, a service layer 1813, or a combination of the API 1812 and service layer 1813. The API 1812 can include specifications for routines, data structures, and object classes. The API 1812 can be either computer-language independent or dependent. The API 1812 can refer to a complete interface, a single function, or a set of APIs.

The service layer 1813 can provide software services to the computer 1802 and other components (whether illustrated or not) that are communicably coupled to the computer 1802. The functionality of the computer 1802 can be accessible for all service consumers using this service layer. Software services, such as those provided by the service layer 1813, can provide reusable, defined functionalities through a defined interface. For example, the interface can be software written in JAVA, C++, or a language providing data in extensible markup language (XML) format. While illustrated as an integrated component of the computer 1802, in alternative implementations, the API 1812 or the service layer 1813 can be stand-alone components in relation to other components of the computer 1802 and other components communicably coupled to the computer 1802. Moreover, any or all parts of the API 1812 or the service layer 1813 can be implemented as child or sub-modules of another software module, enterprise application, or hardware module without departing from the scope of the present disclosure.

The computer 1802 includes an interface 1804. Although illustrated as a single interface 1804 in FIG. 18, two or more interfaces 1804 can be used according to particular needs, desires, or particular implementations of the computer 1802 and the described functionality. The interface 1804 can be used by the computer 1802 for communicating with other systems that are connected to the network 1830 (whether illustrated or not) in a distributed environment. Generally, the interface 1804 can include, or be implemented using, logic encoded in software or hardware (or a combination of software and hardware) operable to communicate with the network 1830. More specifically, the interface 1804 can include software supporting one or more communication protocols associated with communications. As such, the network 1830 or the interface's hardware can be operable to communicate physical signals within and outside of the illustrated computer 1802.

The computer 1802 includes a processor 1805. Although illustrated as a single processor 1805 in FIG. 18, two or more processors 1805 can be used according to particular needs, desires, or particular implementations of the computer 1802 and the described functionality. Generally, the processor 1805 can execute instructions and can manipulate data to perform the operations of the computer 1802, including operations using algorithms, methods, functions, processes, flows, and procedures as described in the present disclosure.

The computer 1802 also includes a database 1806 that can hold data for the computer 1802 and other components connected to the network 1830 (whether illustrated or not). For example, database 1806 can be an in-memory, conventional, or a database storing data consistent with the present disclosure. In some implementations, database 1806 can be a combination of two or more different database types (for example, hybrid in-memory and conventional databases) according to particular needs, desires, or particular implementations of the computer 1802 and the described functionality. Although illustrated as a single database 1806 in FIG. 18, two or more databases (of the same, different, or combination of types) can be used according to particular needs, desires, or particular implementations of the computer 1802 and the described functionality. While database 1806 is illustrated as an internal component of the computer 1802, in alternative implementations, database 1806 can be external to the computer 1802.

The computer 1802 also includes a memory 1807 that can hold data for the computer 1802 or a combination of components connected to the network 1830 (whether illustrated or not). Memory 1807 can store any data consistent with the present disclosure. In some implementations, memory 1807 can be a combination of two or more different types of memory (for example, a combination of semiconductor and magnetic storage) according to particular needs, desires, or particular implementations of the computer 1802 and the described functionality. Although illustrated as a single memory 1807 in FIG. 18, two or more memories 1807 (of the same, different, or combination of types) can be used according to particular needs, desires, or particular implementations of the computer 1802 and the described functionality. While memory 1807 is illustrated as an internal component of the computer 1802, in alternative implementations, memory 1807 can be external to the computer 1802.

The application 1808 can be an algorithmic software engine providing functionality according to particular needs, desires, or particular implementations of the computer 1802 and the described functionality. For example, application 1808 can serve as one or more components, modules, or applications. Further, although illustrated as a single application 1808, the application 1808 can be implemented as multiple applications 1808 on the computer 1802. In addition, although illustrated as internal to the computer 1802, in alternative implementations, the application 1808 can be external to the computer 1802.

The computer 1802 can also include a power supply 1814. The power supply 1814 can include a rechargeable or non-rechargeable battery that can be configured to be either user- or non-user-replaceable. In some implementations, the power supply 1814 can include power-conversion and management circuits, including recharging, standby, and power management functionalities. In some implementations, the power-supply 1814 can include a power plug to allow the computer 1802 to be plugged into a wall socket or a power source to, for example, power the computer 1802 or recharge a rechargeable battery.

There can be any number of computers 1802 associated with, or external to, a computer system containing computer 1802, with each computer 1802 communicating over network 1830. Further, the terms "client," "user," and other appropriate terminology can be used interchangeably, as appropriate, without departing from the scope of the present disclosure. Moreover, the present disclosure contemplates that many users can use one computer 1802 and one user can use multiple computers 1802.

Described implementations of the subject matter can include one or more features, alone or in combination.

For example, in a first implementation, a computer-implemented method includes the following. Aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. Source data is received in real-time from disparate sources and in disparate formats. The source data provides information about the components of the facility and external systems with which the facility interacts. Using the aggregation functions, the source data is aggregated to form the ontological frameworks. Each ontological framework models a component of the Things category, a component of the a Events category, or a component of the Methods category.

The foregoing and other described implementations can each, optionally, include one or more of the following features:

A first feature, combinable with any of the following features, where the disparate formats include structured data, unstructured data, data wrappers, and data wranglers.

A second feature, combinable with any of the previous or following features, where the components of the Things category include mechanical components including wells, rigs, facilities, sensors, and metering systems.

A third feature, combinable with any of the previous or following features, where the components of the Events category include manual and automated actions performed using the components of the Things category.

A fourth feature, combinable with any of the previous or following features, where the components of the Methods category include algorithms, workflows, and processes which numerically or holistically quantify the components of the events category.

A fifth feature, combinable with any of the previous or following features, the method further including: creating an abstraction layer based on the ontological frameworks, the abstraction layer including abstractions that support queries, ontologies, metadata, and data mapping; providing a knowledge discovery layer for discovering knowledge from the abstraction layers, where discovering the knowledge includes graph/network computation, graph/network training and validation, and graph representation learning; and providing a recommendation and advisory systems layer for providing recommendations and advisories associated with the facility.

A sixth feature, combinable with any of the previous or following features, where the facility is a petroleum engineering facility and where the recommendation and advisory systems layer executes agents selected from a group including a reservoir monitoring agent, a surveillance agent, a model calibration agent, a production optimization agent, a field development planning agent, and a risk mitigation agent.

A seventh feature, combinable with any of the previous or following features, the method further including providing a user interface built on the recommendation and advisory systems layer, the user interface: displaying recommendations and advisories generated by the recommendation and advisory systems layer based on current and projected conditions at a facility; receiving, from a user of the user interface, a selection from the user interface; and automatically implementing changes to the facility based on the selection.

In a second implementation, a non-transitory, computer-readable medium storing one or more instructions executable by a computer system to perform operations including the following. Aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. Source data is received in real-time from disparate sources and in disparate formats. The source data provides information about the components of the facility and external systems with which the facility interacts. Using the aggregation functions, the source data is aggregated to form the ontological frameworks. Each ontological framework models a component of the Things category, a component of the a Events category, or a component of the Methods category.

The foregoing and other described implementations can each, optionally, include one or more of the following features:

A first feature, combinable with any of the following features, where the disparate formats include structured data, unstructured data, data wrappers, and data wranglers.

A second feature, combinable with any of the previous or following features, where the components of the Things category include mechanical components including wells, rigs, facilities, sensors, and metering systems.

A third feature, combinable with any of the previous or following features, where the components of the Events category include manual and automated actions performed using the components of the Things category.

A fourth feature, combinable with any of the previous or following features, where the components of the Methods category include algorithms, workflows, and processes which numerically or holistically quantify the components of the events category.

A fifth feature, combinable with any of the previous or following features, the operations further including: creating an abstraction layer based on the ontological frameworks, the abstraction layer including abstractions that support queries, ontologies, metadata, and data mapping; providing a knowledge discovery layer for discovering knowledge from the abstraction layers, where discovering the knowledge includes graph/network computation, graph/network training and validation, and graph representation learning; and providing a recommendation and advisory systems layer for providing recommendations and advisories associated with the facility.

A sixth feature, combinable with any of the previous or following features, where the facility is a petroleum engineering facility and where the recommendation and advisory systems layer executes agents selected from a group including a reservoir monitoring agent, a surveillance agent, a model calibration agent, a production optimization agent, a field development planning agent, and a risk mitigation agent.

A seventh feature, combinable with any of the previous or following features, the operations further including providing a user interface built on the recommendation and advisory systems layer, the user interface: displaying recommendations and advisories generated by the recommendation and advisory systems layer based on current and projected conditions at a facility; receiving, from a user of the user interface, a selection from the user interface; and automatically implementing changes to the facility based on the selection.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. Aggregation functions are defined for ontological frameworks modeling categories of components of a facility. Each aggregation function defines a target component selected from a Things category, an Events category, and a Methods category. Defining the target component includes aggregating information from one or more components selected from one or more of the Things category, the Events category, and the Methods category. Source data is received in real-time from disparate sources and in disparate formats. The source data provides information about the components of the facility and external systems with which the facility interacts. Using the aggregation functions, the source data is aggregated to form the ontological frameworks. Each ontological framework models a component of the Things category, a component of the a Events category, or a component of the Methods category.

The foregoing and other described implementations can each, optionally, include one or more of the following features:

A first feature, combinable with any of the following features, where the disparate formats include structured data, unstructured data, data wrappers, and data wranglers.

A second feature, combinable with any of the previous or following features, where the components of the Things category include mechanical components including wells, rigs, facilities, sensors, and metering systems.

A third feature, combinable with any of the previous or following features, where the components of the Events category include manual and automated actions performed using the components of the Things category.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The invention claimed is:

1. A computer-implemented method, comprising:
    defining aggregation functions for ontological frameworks modeling categories of components of a facility, each aggregation function defining a target component selected from a Things category, an Events category, and a Methods category, wherein defining the target component includes aggregating information from one or more components selected from one or more of the Things category, the Events category, and the Methods category, wherein components of the Things category include mechanical components including wells, rigs, facilities, sensors, and metering systems, wherein components of the Events category include manual and automated actions performed using the components of the Things category, and wherein components of the Methods category include algorithms, workflows, and processes which numerically or holistically quantify the components of the events category;
    receiving, in real-time from disparate sources and in disparate formats, source data providing information about the components of the facility and external systems with which the facility interacts;
    aggregating, using the aggregation functions, the source data to form the ontological frameworks, each ontological framework modeling one or more components of the Things category, one or more components of the Events category, and one or more components of the Methods category, wherein aggregating the source data to form the ontological frameworks includes generating a computation graph, the computation graph including Thing nodes, Event nodes, and Method nodes, wherein edges in the computation graph represent aggregation functions between two or more nodes, including at least one event aggregation function between one or more of each of a Thing node and an Event node, and at least one method aggregation function between one or more of each of an Event node and a Method node;
    determining, using the at least one event aggregation function and information from one or more of each of the Thing nodes and the Event nodes, at least one prediction for the facility, including a prediction for short-term well production in a form of a productivity index;
    receiving, through a user interface, a user-defined semantic query for information from the ontological frameworks, including information about the at least one prediction for the facility;
    generating, in response to the receiving the user-defined semantic query and using at least the ontological frameworks, information in response to the user-defined semantic query, including generating, using predictive modeling and machine learning and based on the prediction for short-term well production, a short-term well prediction response; and
    generating, using the prediction for short-term well production, an edge on the computation graph representing the prediction for short-term well production in a form of a productivity index and connecting the one or more of each of the Thing nodes and the Event nodes used to determine the at least one prediction.

2. The computer-implemented method of claim 1, wherein the disparate formats include structured data, unstructured data, data wrappers, and data wranglers.

3. The computer-implemented method of claim 1, further comprising:
    creating an abstraction layer based on the ontological frameworks, the abstraction layer including abstractions that support queries, ontologies, metadata, and data mapping;
    providing a knowledge discovery layer for discovering knowledge from the abstraction layers, wherein discovering the knowledge includes graph/network computation, graph/network training and validation, and graph representation learning; and
    providing a recommendation and advisory systems layer for providing recommendations and advisories associated with the facility.

4. The computer-implemented method of claim 3, wherein the facility is a petroleum engineering facility and wherein the recommendation and advisory systems layer executes agents selected from a group comprising a reservoir monitoring agent, a surveillance agent, a model calibration agent, a production optimization agent, a field development planning agent, and a risk mitigation agent.

5. The computer-implemented method of claim 3, further comprising providing a user interface built on the recommendation and advisory systems layer, the user interface:
    displaying recommendations and advisories generated by the recommendation and advisory systems layer based on current and projected conditions at a facility;
    receiving, from a user of the user interface, a selection from the user interface; and
    automatically implementing changes to the facility based on the selection.

6. A non-transitory, computer-readable medium storing one or more instructions executable by a computer system to perform operations comprising:
    defining aggregation functions for ontological frameworks modeling categories of components of a facility, each aggregation function defining a target component selected from a Things category, an Events category, and a Methods category, wherein defining the target component includes aggregating information from one or more components selected from one or more of the Things category, the Events category, and the Methods category, wherein components of the Things category include mechanical components including wells, rigs, facilities, sensors, and metering systems, wherein components of the Events category include manual and automated actions performed using the components of the Things category, and wherein components of the Methods category include algorithms, workflows, and processes which numerically or holistically quantify the components of the events category;
    receiving, in real-time from disparate sources and in disparate formats, source data providing information about the components of the facility and external systems with which the facility interacts;
    aggregating, using the aggregation functions, the source data to form the ontological frameworks, each ontological framework modeling one or more components of the Things category, one or more components of the Events category, and one or more components of the Methods category, wherein aggregating the source data to form the ontological frameworks includes generating a computation graph, the computation graph including Thing nodes, Event nodes, and Method nodes, wherein edges in the computation graph represent aggregation functions between two or more nodes, including at least one event aggregation function between one or more of each of a Thing node and an Event node, and at least one method aggregation function between one or more of each of an Event node and a Method node;

determining, using the at least one event aggregation function and information from one or more of each of the Thing nodes and the Event nodes, at least one prediction for the facility, including a prediction for short-term well production in a form of a productivity index;

receiving, through a user interface, a user-defined semantic query for information from the ontological frameworks, including information about the at least one prediction for the facility;

generating, in response to the receiving the user-defined semantic query and using at least the ontological frameworks, information in response to the user-defined semantic query, including generating, using predictive modeling and machine learning and based on the prediction for short-term well production, a short-term well prediction response; and generating, using the prediction for short-term well production, an edge on the computation graph representing the prediction for short-term well production in a form of a productivity index and connecting the one or more of each of the Thing nodes and the Event nodes used to determine the at least one prediction.

7. The non-transitory, computer-readable medium of claim 6, wherein the disparate formats include structured data, unstructured data, data wrappers, and data wranglers.

8. The non-transitory, computer-readable medium of claim 6, further comprising:
creating an abstraction layer based on the ontological frameworks, the abstraction layer including abstractions that support queries, ontologies, metadata, and data mapping;
providing a knowledge discovery layer for discovering knowledge from the abstraction layers, wherein discovering the knowledge includes graph/network computation, graph/network training and validation, and graph representation learning; and
providing a recommendation and advisory systems layer for providing recommendations and advisories associated with the facility.

9. The non-transitory, computer-readable medium of claim 8, wherein the facility is a petroleum engineering facility and wherein the recommendation and advisory systems layer executes agents selected from a group comprising a reservoir monitoring agent, a surveillance agent, a model calibration agent, a production optimization agent, a field development planning agent, and a risk mitigation agent.

10. The non-transitory, computer-readable medium of claim 8, further comprising providing a user interface built on the recommendation and advisory systems layer, the user interface:
displaying recommendations and advisories generated by the recommendation and advisory systems layer based on current and projected conditions at a facility;
receiving, from a user of the user interface, a selection from the user interface; and
automatically implementing changes to the facility based on the selection.

11. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
defining aggregation functions for ontological frameworks modeling categories of components of a facility, each aggregation function defining a target component selected from a Things category, an Events category, and a Methods category, wherein defining the target component includes aggregating information from one or more components selected from one or more of the Things category, the Events category, and the Methods category, wherein components of the Things category include mechanical components including wells, rigs, facilities, sensors, and metering systems, wherein components of the Events category include manual and automated actions performed using the components of the Things category, and wherein components of the Methods category include algorithms, workflows, and processes which numerically or holistically quantify the components of the events category;
receiving, in real-time from disparate sources and in disparate formats, source data providing information about the components of the facility and external systems with which the facility interacts;
aggregating, using the aggregation functions, the source data to form the ontological frameworks, each ontological framework modeling one or more components of the Things category, one or more components of the Events category, and one or more components of the Methods category, wherein aggregating the source data to form the ontological frameworks includes generating a computation graph, the computation graph including Thing nodes, Event nodes, and Method nodes, wherein edges in the computation graph represent aggregation functions between two or more nodes, including at least one event aggregation function between one or more of each of a Thing node and an Event node, and at least one method aggregation function between one or more of each of an Event node and a Method node;
determining, using the at least one event aggregation function and information from one or more of each of the Thing nodes and the Event nodes, at least one prediction for the facility, including a prediction for short-term well production in a form of a productivity index;
receiving, through a user interface, a user-defined semantic query for information from the ontological frameworks, including information about the at least one prediction for the facility;
generating, in response to the receiving the user-defined semantic query and using at least the ontological frameworks, information in response to the user-defined semantic query, including generating, using predictive modeling and machine learning and based on the prediction for short-term well production, a short-term well prediction response; and generating, using the prediction for short-term well production, an edge on the computation graph representing the prediction for short-term well production in a form of a productivity index and connecting the one or more of each of the Thing nodes and the Event nodes used to determine the at least one prediction.

12. The computer-implemented system of claim 11, wherein the disparate formats include structured data, unstructured data, data wrappers, and data wranglers.

* * * * *